(12) United States Patent
Lukac

(10) Patent No.: US 7,995,840 B2
(45) Date of Patent: Aug. 9, 2011

(54) IMAGE PROCESSING APPARATUS, IMAGE PROCESSING METHOD, AND PROGRAM FOR ATTAINING IMAGE PROCESSING

(75) Inventor: Rastislav Lukac, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 646 days.

(21) Appl. No.: 12/058,253

(22) Filed: Mar. 28, 2008

(65) Prior Publication Data

US 2009/0244333 A1  Oct. 1, 2009

(51) Int. Cl.
*G06K 9/00* (2006.01)
(52) U.S. Cl. .......................... 382/167; 382/199
(58) Field of Classification Search .................. 382/167, 382/199, 266, 300; 348/272, 273, 280
See application file for complete search history.

(56) References Cited

U.S. PATENT DOCUMENTS

| | | | |
|---|---|---|---|
| 5,541,668 A | 7/1996 | Kuwahara et al. | |
| 6,507,364 B1 | 1/2003 | Bishay et al. | |
| 6,628,330 B1 | 9/2003 | Lin | |
| 6,781,626 B1 | 8/2004 | Wang | |
| 6,791,609 B2 | 9/2004 | Yamauchi et al. | |
| 6,904,166 B2 | 6/2005 | Hsia et al. | |
| 6,904,169 B2 * | 6/2005 | Kalevo et al. ................. | 382/167 |

(Continued)

FOREIGN PATENT DOCUMENTS

| | | |
|---|---|---|
| EP | 1289310 A2 | 3/2003 |
| JP | 2002-018930 | 1/2002 |
| KR | 20060131083 | 12/2006 |

(Continued)

OTHER PUBLICATIONS

Color Demosaicing Using Variance of Color Differences, (King-Hong Chung and Yuk-Hee Chan), Centre for Multimedia Signal Processing, Department of Electronic and Information Engineering, The Hong Kong Polytechnic University, Hong Kong, Sep. 18, 2006, (pp. 1-23).

*Primary Examiner* — Phuoc Tran
(74) *Attorney, Agent, or Firm* — Mark P. Watson

(57) ABSTRACT

The image processing procedure of the invention receives mosaic image data and calculates a vertical-direction color difference component with regard to each of pixel columns in the mosaic image data in a vertical direction and a horizontal-direction color difference component with regard to each of pixel rows in the mosaic image data in a horizontal direction. The mosaic image data is expressed by a combination of pixel columns with alternate arrangement of pixels of a G component and pixels of an R component in the vertical direction, pixel columns with alternate arrangement of pixels of the G component and pixels of a B component in the vertical direction, pixel rows with alternate arrangement of pixels of the G component and pixels of the R component in the horizontal direction, and pixel rows with alternate arrangement of pixels of the G component and pixels of the B component in the horizontal direction. The image processing procedure subsequently selects pixels of the R component and pixels of the B component from the mosaic image data, and compares a variation of the vertical-direction color difference component with a variation of the horizontal-direction color difference component with regard to each of at least the selected pixels to detect edge orientations of the at least selected pixels. The image processing procedure refers to the detected edge orientations, and interpolates a missing color component in each pixel of the mosaic image data with the settings of one color component in each pixel in the mosaic image data.

10 Claims, 16 Drawing Sheets

U.S. PATENT DOCUMENTS

| | | |
|---|---|---|
| 6,933,970 B2 | 8/2005 | Koshiba et al. |
| 6,970,597 B1 * | 11/2005 | Olding et al. ............ 382/167 |
| 7,088,392 B2 | 8/2006 | Kakarala et al. |
| 2005/0146629 A1 | 7/2005 | Muresan |
| 2006/0170798 A1 | 8/2006 | Lee et al. |
| 2006/0250655 A1 | 11/2006 | Wu |
| 2007/0002154 A1 | 1/2007 | Kang et al. |
| 2007/0110300 A1 | 5/2007 | Chang et al. |

* cited by examiner

FIG. 5

(a) Color Difference Component in Vertical Direction

G-Component Pixel $$CDv(r,s) = \underbrace{z(r,s)}_{\text{G Component}} - \underbrace{(z(r-1,s) + z(r+1,s))/2}_{\text{R Component or B Component}}$$

Non-G-Component Pixel $$CDv(r,s) = \underbrace{(z(r-1,s) + z(r+1,s))/2}_{\text{G Component}} - \underbrace{z(r,s)}_{\text{R Component or B Component}}$$

(b) Color Difference Component in Horizontal Direction

G-Component Pixel $$CDh(r,s) = \underbrace{z(r,s)}_{\text{G Component}} - \underbrace{(z(r,s-1) + z(r,s+1))/2}_{\text{R Component or B Component}}$$

Non-G-Component Pixel $$CDh(r,s) = \underbrace{(z(r,s-1) + z(r,s+1))/2}_{\text{G Component}} - \underbrace{z(r,s)}_{\text{R Component or B Component}}$$

(a)
$$\begin{cases} CDv(r,s) = (\ CDv(r-2,s) + CDv(r-1,s) \\ \qquad\qquad + 4 \cdot CDv(r,s) + CDv(r+1,s) + CDv(r+2,s)\ )/8 \\ \\ CDh(r,s) = (\ CDh(r,s-2) + CDh(r,s-1) \\ \qquad\qquad + 4 \cdot CDh(r,s) + CDh(r,s+1) + CDh(r,s+2)\ )/8 \end{cases}$$

(b)

FIG. 8
(a) $V_v = (CD_v(r+1,s) - CD_v(r,s))^2 + (CD_v(r,s) - CD_v(r-1,s))^2$
$+ (CD_v(r+1,s+1) - CD_v(r,s+1))^2 + (CD_v(r,s+1) - CD_v(r-1,s+1))^2$
$+ (CD_v(r+1,s-1) - CD_v(r,s-1))^2 + (CD_v(r,s-1) - CD_v(r-1,s-1))^2$
(b) 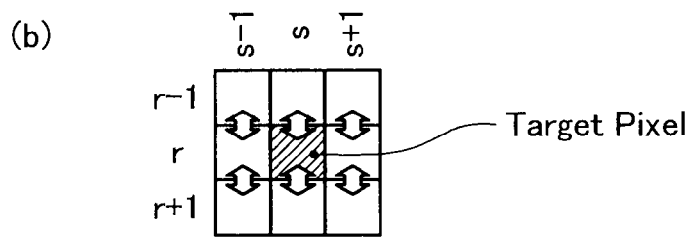
Target Pixel
FIG. 9
(a) $V_h = (CD_h(r,s+1) - CD_h(r,s))^2 + (CD_h(r,s) - CD_h(r,s-1))^2$
$+ (CD_h(r+1,s+1) - CD_h(r+1,s))^2 + (CD_h(r+1,s) - CD_v(r+1,s-1))^2$
$+ (CD_h(r-1,s+1) - CD_h(r-1,s))^2 + (CD_h(r-1,s) - CD_h(r-1,s-1))^2$
(b) 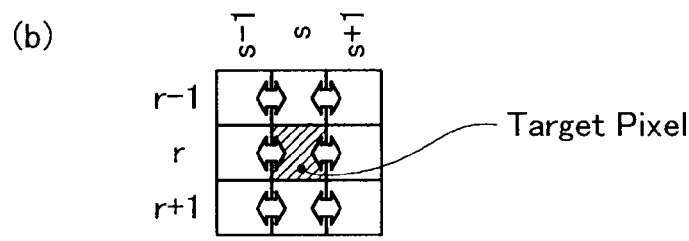
Target Pixel
FIG. 10
(a)
| B | G | B |
|---|---|---|
| G | R | G |
| B | G | B |
(b)
| R | G | R |
|---|---|---|
| G | B | G |
| R | G | R |
(c)
| G | B | G |
|---|---|---|
| R | G | R |
| G | B | G |
(d)
| G | R | G |
|---|---|---|
| B | G | B |
| G | R | G |

FIG. 11

(a) $V_v = 2 \cdot (CDv(r+1,s) - CDv(r,s))^2 + 2 \cdot (CDv(r,s) - CDv(r-1,s))^2$
$+ (CDv(r+1,s+1) - CDv(r,s+1))^2 + (CDv(r,s+1) - CDv(r-1,s+1))^2$
$+ (CDv(r+1,s-1) - CDv(r,s-1))^2 + (CDv(r,s-1) - CDv(r-1,s-1))^2$ (b) $V_h = 2 \cdot (CDh(r,s+1) - CDh(r,s))^2 + 2 \cdot (CDh(r,s) - CDh(r,s-1))^2$
$+ (CDh(r+1,s+1) - CDh(r+1,s))^2 + (CDh(r+1,s) - CDv(r+1,s-1))^2$
$+ (CDh(r-1,s+1) - CDh(r-1,s))^2 + (CDh(r-1,s) - CDh(r-1,s-1))^2$

FIG. 12

(a) $V_v = (CDv(r+1,s) - CDv(r,s))^2 + (CDv(r,s) - CDv(r-1,s))^2$
$+ (CDv(r+1,s+1) - CDv(r,s+1))^2 + (CDv(r,s+1) - CDv(r-1,s+1))^2$ (b) 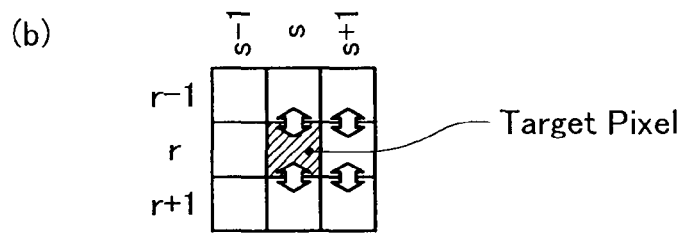

(c) $V_h = (CDh(r,s+1) - CDh(r,s))^2 + (CDh(r,s) - CDh(r,s-1))^2$
$+ (CDh(r+1,s+1) - CDh(r+1,s))^2 + (CDh(r+1,s) - CDv(r+1,s-1))^2$ (d) 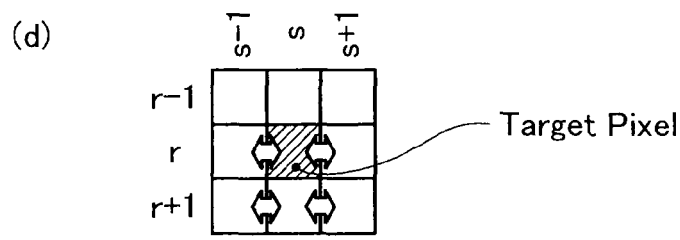

(a) $Vh = (CDh(r,s+2)-CDh(r,s))^2 + (CDh(r,s)-CDh(r,s-2))^2$
$+ (CDh(r+1,s+2)-CDh(r+1,s))^2 + (CDh(r+1,s)-CDv(r+1,s-2))^2$
$+ (CDh(r-1,s+2)-CDh(r-1,s))^2 + (CDh(r-1,s)-CDh(r-1,s-2))^2$ (b) 
Target Pixel (a) $Vh = (CDh(r,s+2)-CDh(r,s))^2 + (CDh(r,s)-CDh(r,s-2))^2$
$+ \sum_{i=-1}^{1}(CDh(r+i,s+1)-CDh(r+i,s))^2 + \sum_{i=-1}^{1}(CDh(r+i,s)-CDh(r+i,s-1))^2$
$+ \sum_{i=-1}^{1}(CDh(r+i,s+1)-CDh(r+i,s-1))^2$ (b) 
Target Pixel (a) $Vh = (CDh(r,s+2)-CDh(r,s))^2 + (CDh(r,s)-CDh(r,s-2))^2$
$+ (CDh(r,s+2)-CDh(r,s-2))^2$
$+ (CDh(r+1,s+2)-CDh(r+1,s))^2 + (CDh(r+1,s)-CDv(r+1,s-2))^2$
$+ (CDh(r+1,s+2)-CDh(r+1,s-2))^2$
$+ (CDh(r-1,s+2)-CDh(r-1,s))^2 + (CDh(r-1,s)-CDh(r-1,s-2))^2$
$+ (CDh(r-1,s+2)-CDh(r-1,s-2))^2$ (b) 
Target Pixel

| B | G | B |
|---|---|---|
| G | R | G |
| B | G | B |

(b)

| R | G | R |
|---|---|---|
| G | B | G |
| R | G | R |

(c)

Edge Orientation d = 1

⇩

Variation Vv of Color Difference Component in Vertical Direction ≦ Variation Vh of Color Difference Component in Horizontal Direction

⇩

Compute G Component from Color Difference Component in Vertical Direction

Add Raw Image Data to Interpolated Color Difference Component in Interpolation Target Pixel to Compute G Component of Interpolation Target Pixel

⇩

Determine G Component to Satisfy Calculated Color Difference Component

| G | B | G |
|---|---|---|
| R | G | R |
| G | B | G |

(b)

| G | R | G |
|---|---|---|
| B | G | B |
| G | R | G |

(c)

|   | 1 |   |
|---|---|---|
| 3 |   | 1 |
|   | 1 |   |

(d)

|   | 3 |   |
|---|---|---|
| 3 |   | 3 |
|   | 1 |   |

IMAGE PROCESSING APPARATUS, IMAGE PROCESSING METHOD, AND PROGRAM FOR ATTAINING IMAGE PROCESSING

BACKGROUND

1. Field of Invention

The present invention relates to a technique of generating image data with an imaging device, such as a digital camera. More specifically the invention pertains to a technique of generating color image data by application of a color filter array having a mosaic arrangement of fine color filters of R (red), G (green), and B (blue) corresponding to three primary colors of light.

2. Description of Related Art

With the advancement of digital techniques, images are generally processed as digital data (image data). Imaging devices such as digital cameras enable immediate output of captured images in the form of image data. The imaging device is typically equipped with an electronic image sensor consisting of small elements for converting the light intensities into electric signals. The imaging device focuses a captured image of a subject on the image sensor by means of an optical system and detects the light intensities in the individual elements as electric signals to generate image data. The light entering the optical system may be divided into three color components R, G, and B corresponding to three primary colors of light. The respective color lights of the three color components R, G, and B are focused on the image sensor, and the electric signals representing the light intensities of the respective color components are output to generate color image data.

The simplest method of focusing the respective color lights of the three color components R, G, and B, which are obtained as divisions of the light entering the optical system, on the image sensor uses a spectroscopic prism to divide the incident light into the color lights of the three color components R, G, and B and focuses the respective color lights on image sensors to generate image data with regard to the respective color components R, G, and B. This method undesirably requires the three image sensors. One extensively used technique allocates one of the R, G, and B color components to each of the elements constituting the image sensor to attain detection of the respective color components R, G, and B by one image sensor. A typical configuration of this technique provides small color filters allowing transmission of only the R component in front of the elements assigned for detection of the R component, small color filters allowing transmission of only the G component in front of the elements assigned for detection of the G component, and small color filters allowing transmission of only the B component in front of the elements assigned for detection of the B component. This configuration enables simultaneous detection of the image data of the three color components R, G, and B by one image sensor. In the technique of detecting the respective color components R, G, and B by one image sensor, each element assigned for detection of a predetermined color component (for example, the R component) is unable to detect the other color components (for example, the G component and the B component). The resulting image data accordingly has a mosaic arrangement of pixels of the R component, pixels of the G component, and pixels of the B component. Interpolation of missing color components in each pixel with color components of adjacent pixels enables generation of color image data with the settings of all the color components R, G, and B in all the pixels.

The imaging device relying on three image sensors to convert the divisional color lights of the three color components R, G, and B into electric signals and generate image data of the respective color components R, G, and B is occasionally called the 'three image sensor' device. The imaging device that uses only one image sensor to generate image data of a mosaic arrangement and compute the missing color components by interpolation is occasionally called the 'single image sensor' device. The process of interpolating the missing color components in the image data of the mosaic arrangement to generate color image data with the settings of all the color components R, G, and B is sometimes referred to as 'demosaicking process'.

The single image sensor device requires the interpolation of the missing color components. This naturally consumes the time for interpolation and may cause the occurrence of pseudo colors due to the interpolation error. There are diverse proposed techniques with a view to preventing the occurrence of pseudo colors while minimizing an increase of the time required for interpolation. One proposed technique computes color difference components (for example, differences between the G component and the R component) in the respective pixels after computation of the missing color components, removes the pixel with the maximum color difference component and the pixel with the minimum color difference component as noise from a pixel array of a preset number of pixels including a target pixel, and recalculates the respective color components in the target pixel (see Japanese Patent Laid-Open No. 2005-167974). Another proposed technique applies low-pass filters to the color difference components computed in the respective pixels and recalculates the respective color components in the target pixel from the color difference components after removal of noise (see Japanese Patent Laid-Open No. 2005-260908).

SUMMARY OF INVENTION

With the consumers' increasing demands for the higher picture quality of imaging devices, development of the demosaicking technique that prevents the occurrence of pseudo colors has been highly demanded. The number of pixels constituting each image captured by the imaging device is increasing to fulfill the consumers' demands for the higher picture quality. Development of the demosaicking technique that enables the high-speed processing has also been demanded.

In order to simultaneously satisfy these contradictory requirements for the prior art demosaicking processes, there would be a demand for providing a demosaicking technique that enables the high-speed processing while effectively preventing the occurrence of pseudo colors.

In order to accomplish at least part of the demands mentioned above, one aspect of the invention is directed to an image processing apparatus that receives mosaic image data having settings of only one color component, among three color components R, G, and B corresponding to three primary colors of light, in each pixel and makes the received mosaic image data subject to a series of image processing to generate color image data with settings of all the three color components R, G, and B in each pixel. The mosaic image data is expressed by a combination of pixel columns with alternate arrangement of pixels of the G component and pixels of the R component as another color component in a vertical direction, pixel columns with alternate arrangement of pixels of the G component and pixels of the B component as another color component in the vertical direction, pixel rows with alternate arrangement of pixels of the G component and pixels of the R component as another color component in a horizontal direction, and pixel rows with alternate arrangement of pixels of the G component and pixels of the B component as another color component in the horizontal direction.

The image processing apparatus includes two directional color difference computation modules, an edge orientation detection module, and a missing color component interpolation module. A vertical-direction color difference component computation module is configured to obtain the G component in the pixel location of another color component or to obtain another color component in the G component pixel location using vertically neighboring available components in order to compute a vertical-direction color difference component between the G component and the another color component in each pixel included in each of the pixel columns of the mosaic image. A horizontal-direction color difference component computation module is configured to obtain the G component in the pixel location of another color component or to obtain another color component in the G component pixel location using horizontally neighboring color components in order to compute a horizontal-direction color difference component between the G component and the another color component in each pixel included in each of the pixel rows of the mosaic image. An edge orientation detection module is configured to select pixels of the R component and pixels of the B component from the mosaic image and in each such pixel location to compare a variation of the vertical-direction color difference component with a variation of the horizontal-direction color difference component with regard to each of at least the selected pixels so as to detect edge orientations of the at least selected pixels. Finally, a missing color component interpolation module is configured to refer to the detected edge orientations and to interpolate a missing color component in each pixel of the mosaic image with the settings of one color component in each pixel in the mosaic image.

Another aspect of the invention is an image processing method corresponding to the image processing apparatus of the above configuration. The image processing method receives mosaic image data having settings of only one color component, among three color components R, G, and B corresponding to three primary colors of light, in each pixel and makes the received mosaic image data subject to a series of image processing to generate color image data with settings of all the three color components R, G, and B in each pixel.

The image processing method receives, as the mosaic image data, image data expressed by a combination of pixel columns with alternate arrangement of pixels of the G component and pixels of the R component as another color component in a vertical direction, pixel columns with alternate arrangement of pixels of the G component and pixels of the B component as another color component in the vertical direction, pixel rows with alternate arrangement of pixels of the G component and pixels of the R component as another color component in a horizontal direction, and pixel rows with alternate arrangement of pixels of the G component and pixels of the B component as another color component in the horizontal direction. The image processing method subsequently obtains the G component and the another color component in each pixel included in each of the pixel columns of the mosaic image data by interpolation, and computes a vertical-direction color difference component between the G component and the another color component in each pixel included in each of the pixel columns in the vertical direction. Similarly the image processing method obtains the G component and the another color component in each pixel included in each of the pixel rows of the mosaic image data by interpolation, and computes a horizontal-direction color difference component between the G component and the another color component in each pixel included in each of the pixel rows in the horizontal direction. The image processing method then selects pixels of the R component and pixels of the B component from the mosaic image data, and in each such pixel location compares a variation of the vertical-direction color difference component with a variation of the horizontal-direction color difference component with regard to each of at least the selected pixels to detect edge orientations of the at least selected pixels. The image processing method refers to the detected edge orientations, and interpolates a missing color component in each pixel of the mosaic image data with the settings of one color component in each pixel in the mosaic image data.

In the image processing apparatus and the corresponding image processing method according to the aspects of the invention, the procedure calculates both the vertical-direction color difference component in each of the pixel columns constituting the received mosaic image data and the horizontal-direction color difference component in each of the pixel rows constituting the mosaic image data. The mosaic image data is expressed as the combination of the pixel columns with alternate arrangement of pixels of the G component and pixels of the R component in the vertical direction, the pixel columns with alternate arrangement of pixels of the G component and pixels of the B component in the vertical direction, the pixel rows with alternate arrangement of pixels of the G component and pixels of the R component in the horizontal direction, and the pixel rows with alternate arrangement of pixels of the G component and pixels of the B component in the horizontal direction. Either the color difference component between the G component and the R component or the color difference component between the G component and the B component is obtained as the vertical-direction color difference component in each pixel column. Similarly either the color difference component between the G component and the R component or the color difference component between the G component and the B component is obtained as the horizontal-direction color difference component in each pixel row. The procedure then selects the pixels of the R component and the pixels of the B component from the mosaic image data, and compares the variation of the vertical-direction color difference component with the variation of the horizontal-direction color difference component with regard to each of at least the selected pixels to detect edge orientations of the at least selected pixels. As explained above, each of the vertical-direction color difference component and the horizontal-direction color difference component represents either the color difference component between the G component and the R component or the color difference component between the G component and the B component. In the pixels of the R component, both the vertical-direction color difference component and the horizontal-direction color difference component are the color difference components between the G component and the R component. Comparison between the vertical-direction color difference component and the horizontal-direction color difference component accordingly enables accurate detection of the edge orientation in each of these pixels of the R component. In the pixels of the B component, both the vertical-direction color difference component and the horizontal-direction color difference component are the color difference components between the G component and the B component. Comparison between the vertical-direction color difference component and the horizontal-direction color difference component accordingly enables accurate detection of the edge orientation in each of these pixels of the B component. The procedure refers to the accurately detected edge orientations and adequately interpolates the missing color component in each pixel of the mosaic image data with the settings of one color component in each pixel in the mosaic image data. This arrangement thus enables generation of adequate color image data.

In the image processing apparatus according to one aspect of the invention, the variation of the vertical-direction color difference component and the variation of the horizontal-direction color difference component used for detection of the edge orientation in each pixel may be calculated in the following manner. According to one preferable application, the image processing apparatus first selects each target pixel as an object of detection of the edge orientation. A variation of the vertical-direction color difference component in the target pixel is calculated from vertical-direction color difference components of a target pixel column including the target pixel and vertical-direction color difference components of an adjacent pixel column adjoining to the target pixel column. In one example, the variation of the vertical-direction color difference component in the target pixel may be calculated from the vertical-direction color difference components of the target pixel column including the target pixel and two pixel columns, that is, two adjacent pixel column adjoining to the target pixel column. In another example, the variation of the vertical-direction color difference component in the target pixel may be calculated from the vertical-direction color difference components of a greater number of pixel columns, that is, at least the target pixel column including the target pixel and two adjacent pixel columns on both sides of the target pixel column. Similarly a variation of the horizontal-direction color difference component in the target pixel is calculated from horizontal-direction color difference components of a target pixel row including the target pixel and horizontal-direction color difference components of an adjacent pixel row adjoining to the target pixel row. In this case, the variation of the horizontal-direction color difference component in the target pixel may be calculated from the horizontal-direction color difference components of two pixel rows, that is, the target pixel row including the target pixel and one adjacent pixel row adjoining to the target pixel row, or may be calculated from the horizontal-direction color difference components of a greater number of pixel rows.

The calculation based on the multiple pixel columns including at least the target pixel column including the target pixel as the object of detection of the edge orientation and one adjacent pixel column adjoining to the target pixel column determines the variation of the vertical-direction color difference component with the higher accuracy, compared with the calculation based on a single pixel column. Similarly the calculation based on the multiple pixel rows including at least the target pixel row including the target pixel and one adjacent pixel row adjoining to the target pixel row determines the variation of the horizontal-direction color difference component with the higher accuracy, compared with the calculation based on a single pixel row. Comparison between the accurately calculated variation of the vertical-direction color difference component and the accurately calculated variation of the horizontal-direction color difference component in the target pixel enables adequate detection of the edge orientation in the target pixel.

There are two different types of the vertical-direction color difference components in the pixel columns, that is, the color difference components between the G component and the R component and the color difference components between the G component and the B component. The vertical-direction color difference components of mutually adjacent pixel columns may not have the same types of vertical-direction color difference components. In this case, calculation of the variation from the color difference components of the different types seems to be meaningless. It is, however, empirically known that the color difference components of even the different types have variations of similar tendency in adjacent locations in an image. The variation of the vertical-direction color difference component in the target pixel calculated from the color difference components of even the different types is accordingly of significance. The calculation from the vertical-direction color difference components in the multiple adjacent pixel columns thus determines the variation of the vertical-direction color difference component in the target pixel with the high accuracy. There are also two different types of horizontal-direction color difference components in the pixel rows, that is, the color difference components between the G component and the R component and the color difference components between the G component and the B component. The variation of the horizontal-direction color difference component in the target pixel calculated from the color difference components of even the different types is accordingly of significance. The calculation from the horizontal-direction color difference components in the multiple adjacent pixel rows thus determines the variation of the horizontal-direction color difference component in the target pixel with the high accuracy. Comparison between the variation of the vertical-direction color difference component and the variation of the horizontal-direction color difference component in the target pixel enables adequate detection of the edge orientation in the target pixel.

According to another preferable application of the above aspect of the invention, the image processing apparatus the edge orientations in only the pixels of the R component and the pixels of the B component included in the mosaic image data.

The pixels of the R component and the pixels of the B component in the mosaic image data require interpolation of the G component. The G component is closer to a specific wavelength at which the human vision has the higher sensitivity to a variation in lightness, compared with the B component and the R component. Accordingly the G component has the greater influence on the resulting picture quality. Detection of the edge orientations in the pixels of the R component and the pixels of the B component in the mosaic image data enables the G component to be interpolated in these pixels with reference to the detected edge orientations. This arrangement ensures efficient and adequate interpolation even when the edge orientations are not detected for all the pixels.

According to still another preferable application of the above aspect of the invention, the image processing apparatus detects the edge orientation in each pixel as the horizontal direction, when the variation of the vertical-direction color difference component of the pixel is greater than the variation of the horizontal-direction color difference component of the pixel. The image processing apparatus detects the edge orientation in each pixel as the vertical direction, when the variation of the vertical-direction color difference component of the pixel is smaller than the variation of the horizontal-direction color difference component of the pixel. The image processing apparatus detects the edge orientation in each pixel as either the vertical direction or the horizontal direction, when the variation of the vertical-direction color difference component of the pixel is equal to the variation of the horizontal-direction color difference component of the pixel. In this case, the edge orientation in the pixel may be fixed to the vertical direction or the horizontal direction or may be changed over alternately or at random between the vertical direction and the horizontal direction.

The edge orientation is either the vertical direction or the horizontal direction. Such setting significantly simplifies interpolation of the missing color components. In this application, interpolation is performed on the assumption that either an edge in the vertical direction or an edge in the horizontal direction is present even in a pixel actually having a diagonal edge or even no edge. The assumption of the presence of either an edge in the vertical direction or an edge in the horizontal direction in the pixel with no edge, however, usually has no influence on the resulting picture quality. In addition, interpolation with estimation of the vertical and horizontal edge orientation in a pixel with the diagonal edge usually does not worsen the resulting picture quality to a noticeable extent due to using the refined interpolation concept described later.

According to another preferable application of the above aspect of the invention, the image processing apparatus interpolates the G component as the missing color component in an interpolation target pixel as an object of interpolation with color components in one pair of adjacent pixels, which is selected between a pair of upper and lower adjacent pixels above and below the interpolation target pixel and a pair of left and right adjacent pixels on the left and on the right of the interpolation target pixel.

When the edge orientation detected in the interpolation target pixel is the vertical direction, the G component in the interpolation target pixel is interpolated with the color components obtained in the pair of upper and lower adjacent pixels above and below the interpolation target pixel. When the edge orientation detected in the interpolation target pixel in the horizontal direction, on the other hand, the G component in the interpolation target pixel is interpolated with the color components obtained in the pair of left and right adjacent pixels on the left and on the right of the interpolation target pixel. When the interpolation target pixel has no edge, the G component in the interpolation target pixel is interpolated with the color components obtained in either the pair of upper and lower adjacent pixels above and below the interpolation target pixel or the pair of left and right adjacent pixels on the left and on the right of the interpolation target pixel. This arrangement enables high-speed interpolation of the G component based on the color components of the two adjacent pixels. The interpolation target pixels as the objects of interpolation of the G component are the non-G pixels (the R pixels and the B pixels) with no settings of the G component in the mosaic image data. The mosaic image data include a relatively large number of such non-G pixels. The high-speed interpolation of the G component significantly accelerates the overall processing of interpolating the missing color components in the mosaic image data.

In one preferable embodiment of the above application for interpolation of the G component in the interpolation target pixel, the image processing apparatus interpolates either a vertical-direction color difference component or a horizontal-direction color difference component in the interpolation target pixel with either vertical-direction color difference components in the pair of upper and lower adjacent pixels above and below the interpolation target pixel or horizontal-direction color difference components in the pair of left and right adjacent pixels on the left and on the right of the interpolation target pixel. The image processing apparatus then computes the G component in the interpolation target pixel, based on either the vertical-direction color difference component or the horizontal-direction color difference component interpolated in the interpolation target pixel and setting of a color component of the interpolation target pixel in the mosaic image data.

For interpolation pixels where the object of interpolation is the G component, either the R component or the B component exists. The color difference component in the vertical-direction and the color difference component in the horizontal-direction is given as a difference between the G component and the existing component. The image processing apparatus of the above configuration interpolates the vertical-direction color difference component or the horizontal-direction color difference component in the interpolation target pixel with the vertical-direction color difference components in the upper and the lower adjacent pixels above and below the interpolation target pixel or with the horizontal-direction color difference components in the left and the right adjacent pixels on the left and on the right of the interpolation target pixels. The G component in the interpolation target pixel is readily computable from the interpolated vertical-direction color difference component or horizontal-direction color difference component and the color component of the mosaic image data set in the interpolation target pixel. The computation from the interpolated color difference component in the vertical direction or in the horizontal direction ensures adequate computation of the G component, while effectively preventing the occurrence of pseudo colors. A significant variation in difference between the G component and the R component or a significant variation in difference between the G component and the B component leads to an observable color change. Interpolation of the respective color components R, G, and B may cause a difference between the color components in an interpolation target pixel to be significantly varied from the corresponding differences between the color components in adjacent pixels. This may lead to the occurrence of pseudo colors. Interpolation of the color difference component in the vertical direction or in the horizontal direction and computation of the G component from the interpolated color difference component, however, prevents a large variation in difference between the color components in at least the interpolating direction. This arrangement effectively prevents the occurrence of pseudo colors.

In another preferable embodiment of the above application, the image processing apparatus interpolates the G component in all pixels with no settings of the G component in the mosaic data and subsequently interpolates the other missing color components in the pixels.

As described above, the G component in each interpolation target pixel is quickly interpolated, based on the color components obtained in either the adjacent pixels above and below the interpolation target pixel or the adjacent pixels on the left and on the right of the interpolation target pixel. After the high-speed interpolation of the G components in all the pixels with no settings of the G component in the mosaic image data, the other missing color components can be readily and quickly interpolated with the interpolated G components and settings of color components of the pixels in the mosaic image data.

In another preferable application of the above aspect of the invention, the image processing apparatus detects the edge orientations in at least the pixels of the R component and the pixels of the B component included in the mosaic image data to create an edge orientation map, prior to the interpolation of the missing color components. The image processing apparatus refers to the edge orientations stored in the edge orientation map to interpolate the missing color component in each pixel of the mosaic image data.

In the image processing apparatus of this configuration, the detection of the edge orientations is separated from the interpolation of the missing color components in the respective pixels and thus desirably simplifies the overall processing.

The edge orientations of multiple pixels are simultaneously obtainable by simply referring to the edge orientation map. The missing color component in each pixel is adequately interpolated, based on the edge orientations of adjacent pixels. In the structure of detecting the edge orientations with regard to only the pixels of the R component and the pixels of the B component in the mosaic image data, there are pixels with no detection of the edge orientations. Even in such a case, the missing color component of each pixel may be interpolated, based on the edge orientation of the pixel estimated from the detected edge orientations of adjacent pixels.

In another application of the invention, a computer reads a program stored on a computer-readable medium for actualizing the image processing method described above to attain the respective functions. Another aspect of the invention is accordingly a computer-readable medium that stores a program that causes a computer to actualize a method of receiving mosaic image data having settings of only one color component, among three color components R, G, and B corresponding to three primary colors of light, in each pixel and making the received mosaic image data subject to a series of image processing to generate color image data with settings of all the three color components R, G, and B in each pixel.

The program causes the computer to attain the functions of:

receiving, as the mosaic image data, image data expressed by a combination of pixel columns with alternate arrangement of pixels of the G component and pixels of the R component as another color component in a vertical direction, pixel columns with alternate arrangement of pixels of the G component and pixels of the B component as another color component in the vertical direction, pixel rows with alternate arrangement of pixels of the G component and pixels of the R component as another color component in a horizontal direction, and pixel rows with alternate arrangement of pixels of the G component and pixels of the B component as another color component in the horizontal direction;

obtaining the G component in the pixel location of another color component or obtaining another color component in the G component pixel location using vertically neighboring available components in order to compute a vertical-direction color difference component between the G component and the another color component in each pixel included in each of the pixel columns of the mosaic image;

obtaining the G component in the pixel location of another color component or obtaining another color component in the G component pixel location using horizontally neighboring color components in order to compute a horizontal-direction color difference component between the G component and the another color component in each pixel included in each of the pixel rows of the mosaic image;

selecting pixels of the R component and pixels of the B component from the mosaic image data, and in each such pixel location comparing a variation of the vertical-direction color difference component with a variation of the horizontal-direction color difference component with regard to the selected pixels to detect edge orientations of at least the selected pixels; and referring to the detected edge orientations, and interpolating two missing color components in each pixel of the mosaic image data with the settings of one color component in each pixel in the mosaic image data.

The computer reads the program according to this aspect of the invention to attain the respective functions described above and adequately interpolate the missing color components of the mosaic image data. This arrangement thus ensures the high-speed generation of the color image data while effectively preventing the occurrence of pseudo colors.

BRIEF DESCRIPTION OF THE DRAWINGS

FIG. 5 shows calculation formulae for calculating color difference components from raw image data;

FIG. 8 shows calculation of a variation Vv in a vertical direction from color difference components CDv in the vertical direction;

FIG. 9 shows calculation of a variation Vh in a horizontal direction from color difference components CDh in the horizontal direction;

FIG. 10 shows possible arrangements of adjacent pixels around a target pixel selected for detection of an edge orientation;

FIG. 11 shows one method applicable to detection of edge orientations in G pixels;

FIG. 12 shows another method applicable to detection of the edge orientations in the G pixels;

FIG. 17 shows a processing flow of computing the missing G component in non-G pixels;

FIG. 20 shows estimation of an edge orientation in a G interpolation target pixel from edge orientations of adjacent pixels.

DESCRIPTION OF THE PREFERRED EMBODIMENTS

Figure 1:
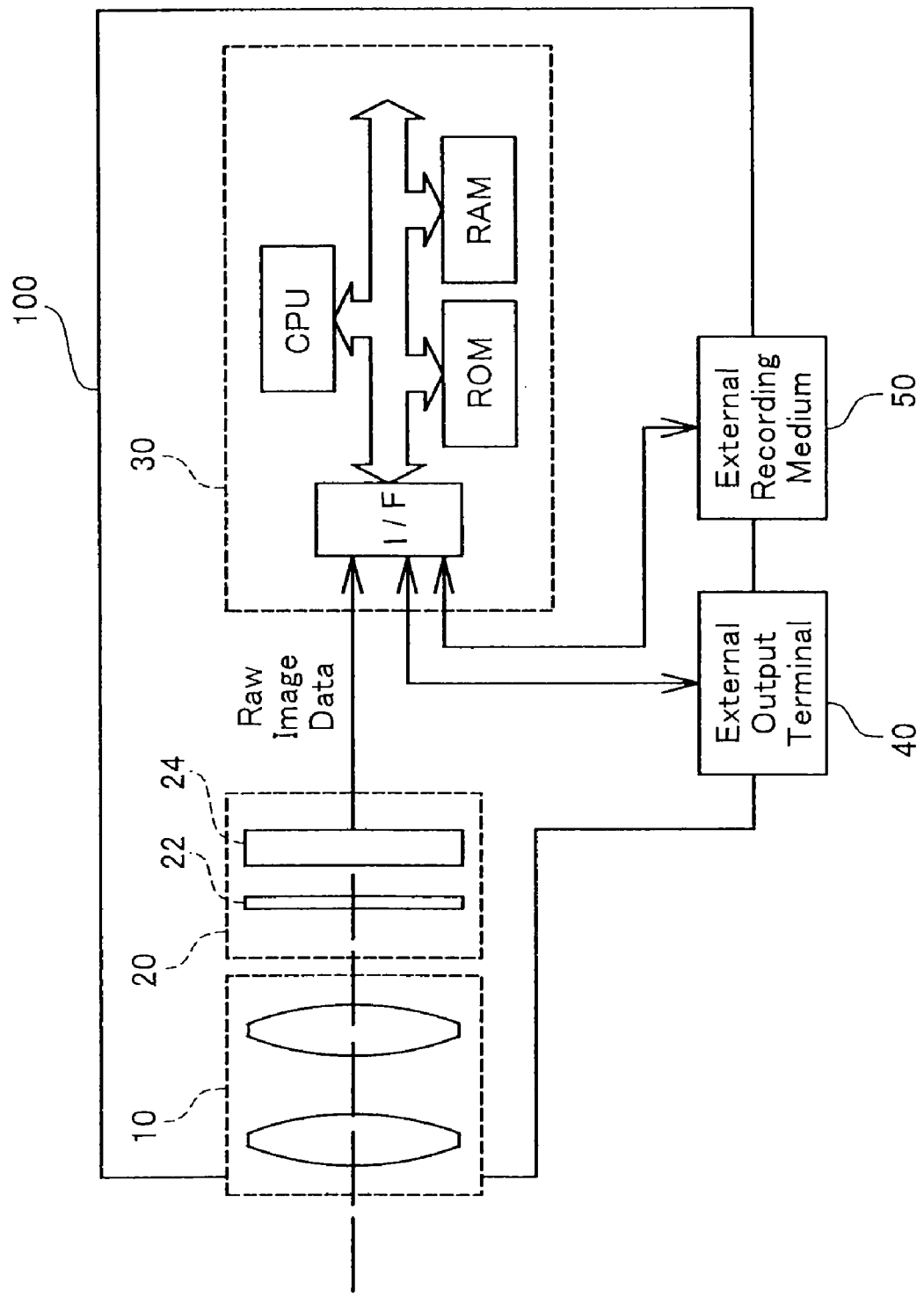
FIG. 1 schematically illustrates the configuration of a digital camera equipped with an image processing apparatus in one embodiment of the invention.

The invention may be understood more fully with reference to a preferred embodiment described below in the following sequence based on the accompanied drawings:
A. System Configuration
B. Outline of Color Image Data Generation Process C. Edge Orientation Map Creation Process
D. G Component Interpolation Process
E. Non-G Pixel Interpolation Process
F. G Pixel Interpolation Process A. System Configuration FIG. 1 schematically illustrates the configuration of a digital camera 100 equipped with an image processing apparatus 30 in one embodiment of the invention. As illustrated, the digital camera 100 includes an optical system 10 that has a group of multiple lenses, an imaging assembly 20 that converts an image of a subject formed by the optical system 10 into electric signals, and the image processing apparatus 30 that receives the electric signals from the imaging assembly 20 and makes the received electric signals subjected to a predetermined series of image processing to generate color image data.

The imaging assembly 20 has an image sensor 24 with a two-dimensional arrangement of multiple fine imaging elements for converting the light intensities into electric signals. A color filter array 22 is provided before the image sensor 24 and has a mosaic arrangement of fine color filters of R (red), G (green), and B (blue). The arrangement of the R, G, and B color filters constituting the color filter array 22 will be described later in detail. The R color filters, the G color filters, and the B color filters are constructed to allow transmission of R color light, transmission of G color light, and transmission of B color light, respectively. The image sensor 24 captures image data having a mosaic arrangement of image parts responsive to the R light intensities, image parts responsive to the G light intensities, and image parts responsive to the B light intensities according to the mosaic arrangement of the R, G, and B color filters in the color filter array 22.

The image processing apparatus 30 mounted on the digital camera 100 receives the image data of the mosaic arrangement from the imaging assembly 20 and generates color image data with settings of the R component, the G component, and the B component in the respective pixels. In the image processing apparatus 30 of the embodiment, a CPU, a ROM, a RAM, and a data input/output interface (I/F) are interconnected via a bus to enable mutual data transmission. The CPU performs a series of processing to generate the color image data according to a program stored in the ROM. The resulting color image data thus generated may be output to an external device via an external output terminal 40 or may be output to an external recording medium 50.

The image data with the mosaic arrangement of the R, G, and B components captured by the image sensor 24 is used as source data, which is referred to by the image processing apparatus 30 to generate the color image data with the settings of the R, G, and B components in the respective pixels. The image data of the mosaic arrangement captured by the image sensor 24 may thus be hereafter referred to as 'raw image data'.

Figure 2:
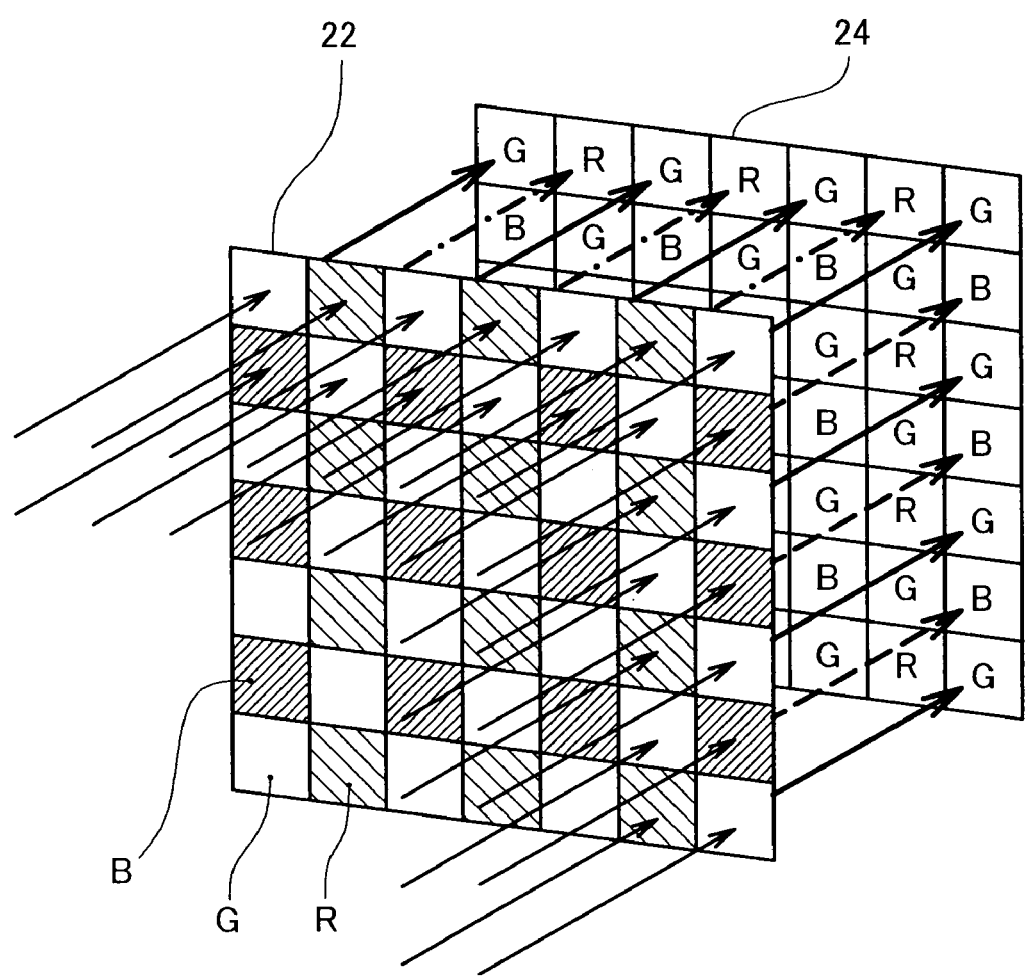
FIG. 2 is a conceptual view showing the structure of a color filter array and an image sensor included in the image processing apparatus of FIG. 1.

FIG. 2 is a conceptual view showing the structure of the color filter array 22 and the image sensor 24. As mentioned above, the image sensor 24 has the two-dimensional arrangement of fine imaging elements that output electric signals corresponding to the light intensities. In the illustrated example of FIG. 2, the fine imaging elements are arranged in a lattice pattern. Each of small rectangles in the lattice pattern of the image sensor 24 conceptually represents one imaging element.

The color filter array 22 has one of the R color filter, the G color filter, and the B color filter set corresponding to the position of each of the multiple imaging elements constituting the image sensor 24. In FIG. 2, the sparsely hatched rectangles, the densely hatched rectangles, and the non-hatched open rectangles respectively denote the R color filters, the B color filters, and the G color filters. In the arrangement of the R, G, and B color filters, the G color filters are positioned first to be diagonal to one another and form a checkerboard pattern. Namely the G color filters occupy half the area of the color filter array 22. The same numbers of the R color filters and the B color filters are then evenly arranged in the remaining half area of the color filter array 22. The resulting color filter array 22 of this arrangement shown in FIG. 2 is called the Bayer color filter array.

As mentioned above, the G color filters, the R color filters, and the B color filters are designed to allow transmission of only the G color light, transmission of only the R color light, and transmission of only the B color light, respectively. The image sensor 24 accordingly captures the image data of the mosaic arrangement by the function of the Bayer color filter array 22 located before the image sensor 24 as shown in FIG. 2. The image data of the mosaic arrangement is not processable in the same manner as ordinary image data and can not directly express an image. The image processing apparatus 30 receives the image data of the mosaic arrangement (raw image data) and generates ordinary color image data having the settings of the R, G, and B components in the respective pixels.

B. Outline of Color Image Data Generation Process

Figure 3:
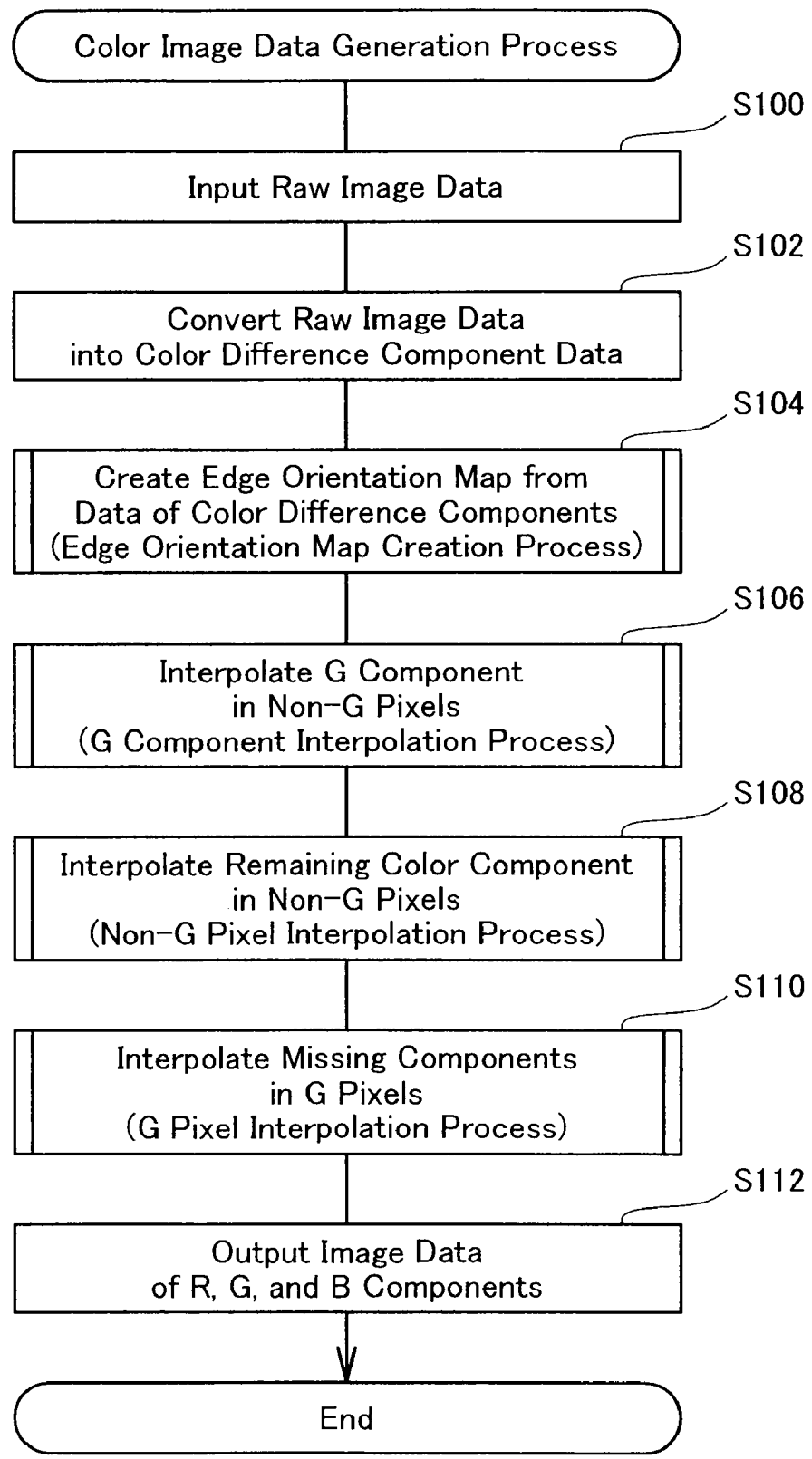
FIG. 3 is a flowchart showing a color image data generation process, which is executed by the image processing apparatus of the embodiment to generate color image data from raw image data.

FIG. 3 is a flowchart showing a color image data generation process, which is executed by the image processing apparatus 30 of the embodiment to generate color image data from the raw image data. In the structure of this embodiment, the CPU included in the image processing apparatus 30 executes this color image data generation by the software configuration. This is, however, not essential, but a specific hardware element, for example, a signal processor, may be used for the same purpose.

On the start of the color image data generation process, the CPU first receives raw image data as source data from the image sensor 24 (step S100) and converts the received raw image data into data of color difference components (step S102) as described below in detail.

Figure 4:
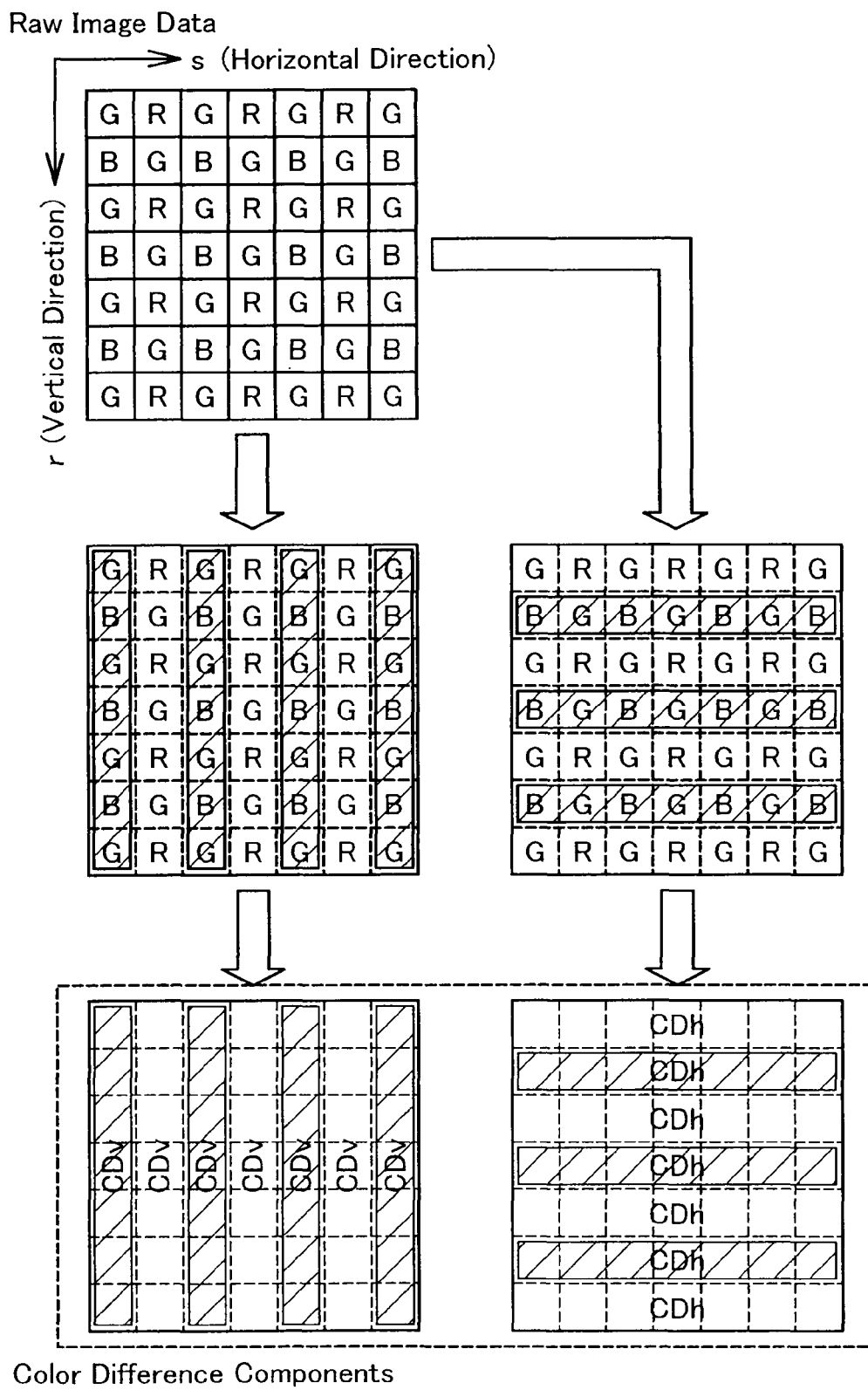
FIG. 4 conceptually shows a process of converting raw image data into data of color difference components.

FIG. 4 conceptually shows a process of converting raw image data into data of color difference components. The top of FIG. 4 shows a conceptual view of the raw image data read from the image sensor 24. The raw image data obtained with the Bayer color filter array has the mosaic arrangement of the R, G, and B components. In a horizontal direction, there are only two types of pixel rows in the raw image data: pixel rows having alternately arranged G pixels (pixels with G component) and R pixels (pixels with R component) and pixel rows having alternately arranged G pixels and B pixels (pixels with B component). In a vertical direction, there are similarly only two types of pixel columns in the raw image data: pixel columns having alternately arranged G pixels and R pixels and pixel columns having alternately arranged G pixels and B pixels. The middle of FIG. 4 conceptually shows that the raw image data consists of only the pixel rows of alternate G pixels and R pixels and the pixel rows of alternate G pixels and B pixels in the horizontal direction while consisting of only the pixel columns of alternate G pixels and R pixels and the pixel columns of alternate G pixels and B pixels.

Based on this result of observation, the color image data generation process of this embodiment converts the raw image data of the R, G, and B components into data representing differences of color components of the pixel rows in the horizontal direction (color difference components in the horizontal direction) and data representing differences of color components of the pixel columns in the vertical direction (color difference components in the vertical direction).

For example, the raw image data is converted into data on color difference components between G and R components with regard to the pixel rows or the pixel columns of alternate G pixels and R pixels. Similarly the raw image data is converted into data on color difference components between G and B components with regard to the pixel rows or the pixel columns of alternate G pixels and B pixels. Calculation formulae for calculating the color difference components will be described in detail later.

The bottom of FIG. 4 conceptually shows the color difference components in the horizontal direction and in the vertical direction thus obtained. A left-side view on the bottom shows color difference components CDv in the vertical direction obtained by processing the raw image data in the vertical direction. Each of hatched pixel columns is a pixel column of alternate G pixels and B pixels. Each color difference component CDv on this pixel column accordingly represents a color difference component between the G component and the B component. Each of remaining non-hatched pixel columns is a pixel column of alternate G pixels and R pixels. Each color difference component CDv on this pixel column accordingly represents a color difference component between the G component and the R component. The raw image data in the horizontal direction is similarly processable. Each of hatched pixel rows gives color difference components CDh between the G pixels and the B pixels. Each of the remaining non-hatched pixel rows gives color difference components CDh between the G pixels and the R pixels.

FIG. 5 shows calculation formulae for calculating the color difference components from the raw image data. FIG. 5(a) shows calculation formulae for calculating the color difference components CDv in the vertical direction, and FIG. 5(b) shows calculation formulae for calculating the color difference components CDh in the horizontal direction. In these calculation formulae, 'z' denotes values of the raw image data obtained by the image sensor 24, and z(r,s) shows a value at a specific position defined by an r-th pixel position downward from the position of the origin set in an image and an s-th pixel position rightward from the position of the origin (see the top of FIG. 4).

Referring to FIG. 5(a), the description regards the calculation formulae for calculating the color difference components CDv in the vertical direction. When a target pixel as an object of computation of the color difference component CDv is a pixel with the G component (G pixel), the upper calculation formula of FIG. 5(a) is adopted. The process first calculates an average of values of upper and lower pixels above and below the target pixel (that is, a second term surrounded by the one-dot chain line) and subtracts the calculated average from the G component of the target pixel (that is, a first term surrounded by the broken line) to calculate a color difference component CDv of the target pixel in the vertical direction. Since the target pixel for computation of the color difference component CDv is the G pixel, the tone value z(r,s) of the target pixel naturally represents the G component. The element z(r−1,s) in the second term shows a tone value of the raw image data in the upper pixel above the target pixel, whereas the element z(r+1,s) in the second term shows a tone value of the raw image data in the lower pixel below the target pixel. As explained above with reference to FIG. 4, the upper and the lower pixels above and below the target G pixel may be R pixels or B pixels but are always pixels of an identical color component. The second term surrounded by the one-dot chain line in the upper calculation formula in FIG. 5(a) accordingly represents either the R component or the B component calculated from the values of the upper and the lower pixels (that is, either the R pixels or the B pixels). Application of the upper calculation formula in FIG. 5(a) determines the color difference component CDv in the vertical direction with regard to the pixel with the G component (G pixel), irrespective of the upper and the lower pixels as the R pixels or the B pixels.

It should be noted that application of the identical calculation formula to the R pixels and the B pixels as the upper and the lower pixels gives two different types of the color difference components CDv. When the upper and the lower pixels are the R pixels, the resulting color difference component CDv in the vertical direction represents the color difference component between the G component and the R component. When the upper and the lower pixels are the B pixels, on the other hand, the resulting color difference component CDv in the vertical direction represents the color difference component between the G component and the B component.

The color difference components CDv in the vertical direction are similarly computable with regard to pixels other than the G pixels (that is, R pixels and B pixels). For example, when a target pixel as the object of computation of the color difference component CDv is an R pixel, upper and lower pixels above and below the target pixel are G pixels as explained above with reference to FIG. 4. The average of the values of the upper and the lower pixels is believed to specify the G component in the target pixel as the object of computation of the color difference component CDv. Subtraction of the tone value of the target pixel (in this case, the R component) from the specified G component determines the color difference component CDv. Each B pixel set as the target pixel is subjected to the same series of processing. With regard to the pixels other than the G pixels, as shown in the lower calculation formula of FIG. 5(a), subtraction of a second term surrounded by the one-dot chain line from a first term surrounded by the broken line on the right side gives the color difference component CDv in the vertical direction.

The identical calculation formula is applicable to computation of the color difference components CDv in the vertical direction, with regard to both the R pixel and the B pixel set as the target pixel other than the G pixel. It should, however, be noted that the R pixel and the B pixel processed as the target pixel give two different types of the color difference components CDv. When the target pixel is the R pixel, the resulting color difference component CDv represents the color difference component between the G component and the R component. When the target pixel is the B pixel, on the other hand, the resulting color difference component CDv represents the color difference component between the G component and the B component.

The color image data generation process of the embodiment applies the completely identical calculation formulae for the advanced processing with the two different types of the color difference components CDv. Application of the identical calculation formulae desirably attains the simplicity and the high speed of the advanced processing with the two different types of the color difference components CDv, which are comparable to the conventional simple processing. Unlike the conventional simple processing, however, this advanced processing of the embodiment enables adequate demosaicking with prevention of the occurrence of pseudo colors.

The color difference components CDh in the horizontal direction are computable in the same manner as the color difference components CDv in the vertical direction explained above. The computation of the color difference components CDh is explained briefly with reference to FIG. 5(b). As shown in the upper calculation formula of FIG. 5(b), subtraction of a second term surrounded by the one-dot chain line from a first term surrounded by the broken line on the right side gives the color difference component CDh of the G pixel in the horizontal direction. In the calculation formula, the element z(r,s) represents a tone value (that is, the G component) of the raw image data in a target pixel as the object of computation of the color difference component. The element z(r,s−1) shows a tone value of the raw image data in a left pixel on the left of the target pixel, whereas the element z(r,s+1) shows a tone value of the raw image data in a right pixel on the right of the target pixel. The left and the right pixels on the left and the right of the target G pixel may be R pixels or B pixels but are always pixels of an identical color component.

In computation of the color difference component CDh in the horizontal direction with regard to a target pixel other than the G pixel (that is, with regard to either an R target pixel or a B target pixel), the left and the right pixels on the left and the right of the R or B target pixel are the G pixels. As shown in the lower calculation formula of FIG. 5(b), subtraction of a second term surrounded by the one-dot chain line (a tone value of the target pixel) from a first term surrounded by the broken line (an average of values of the left and the right pixels) gives the color difference component CDh in the horizontal direction.

The identical calculation formulae are applicable to computation of the color difference components CDh in the horizontal direction, with regard to the target G pixel having the R pixels or the B pixels as the left and the right pixels and with regard to both the R pixel and the B pixel set as the target pixel other than the G pixel. The computation, however, gives two different types of the color difference components CDh, that is, the color difference component between the G component and the R component and the color difference component between the G component and the B component. Application of the completely identical calculation formulae desirably attains the simplicity and the high speed of the advanced processing with the two different types of the color difference components CDh in the horizontal direction, which are comparable to the conventional simple processing.

As clearly understood from the comparison between FIGS. 5(a) and 5(b), the calculation formulae used for computation of the color difference components CDv in the vertical direction are significantly similar to the calculation formulae used for computation of the color difference components CDh in the horizontal direction. Namely the processing flow can be standardized for computation of both the color difference components CDv and CDh in the two different directions. This further enhances the simplicity and the high speed of the overall processing.

At step S102 in the flowchart of FIG. 3, the raw image data captured by the image sensor 24 is converted into the color difference components CDv in the vertical direction and the color difference components CDh in the horizontal direction. It is preferable, although not essential, to apply low pass filters to the color difference components CDv in the vertical direction and the color difference components CDh in the horizontal direction for the purpose of removal of possible noise from these color difference components. As explained later, the color image data generation process of the embodiment uses the color difference components for detection of the edge orientations included in the image. Application of the low pass filters is generally undesirably since the low pass filters have a tendency to blur the edges and lower the detection accuracy of the edges. The procedure of this embodiment, however, enables detection of the edge orientations with extremely high accuracy as described later. Some blur of the edges thus does not significantly lower the detection accuracy, but the noise removal enables stable detection of the edge orientations.

Figure 6:
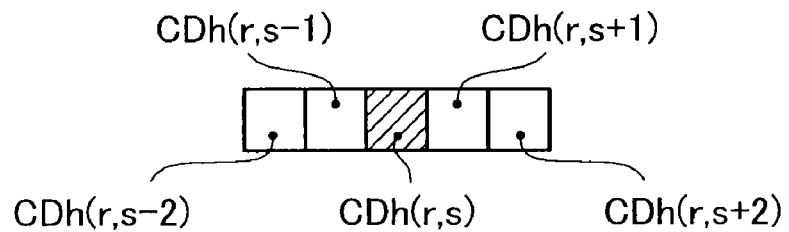
FIG. 6 shows low pass filters applied for removal of noise included in color difference components.

FIG. 6 shows low pass filters applied for removal of noise included in color difference components. FIG. 6(a) shows low pass filters to be applied to the color difference components CDv in the vertical direction and to be applied to the color difference components CDh in the horizontal direction. For the better understanding, FIG. 6(b) shows application of the low pass filter to the color difference component CDh in the horizontal direction. A target pixel as an object of application of the low pass filter is represented by a hatched rectangle in FIG. 6(b). The low pass filter of this embodiment sums up a color difference component in the target pixel and color difference components in two left pixels and two right pixels on the left and on the right of the target pixel. The color difference component of the target pixel is multiplied by a weight of four pixels, so that the summed color difference components correspond to eight pixels. In this case, simple 3-bit shift of the sum to the lower bit gives a color difference component of one pixel, which is equivalent to a division of the sum by 8. Such weighting enables the high-speed processing with the low pass filter.

Each of the color difference components CDv in the vertical direction and the color difference components CDh in the horizontal direction may represent the color difference component between the G component and the R component or the color difference component between the G component and the B component, as explained previously. The low pass filters are applicable to the color difference components CDv in the vertical direction and the color difference components CDh in the horizontal direction without taking into account such different types of the color difference components. The color image data generation process of the embodiment thus attains the extreme simplicity and the high speed of the advanced processing.

Referring back to the flowchart of FIG. 3, after computation of the color difference components CDv in the vertical direction and the color difference components CDh in the horizontal direction in the above manner, the color image data generation process of the embodiment creates an edge orientation map with these data on the color difference components (edge orientation map creation process) (step S104). The edge orientation map shows the orientation of each edge included in the image as either the vertical direction or the horizontal direction. The edge orientation may not be necessarily set for all the pixels but should be set at least for the non-G pixels (that is, the R pixels and the B pixels). The color image data generation process of the embodiment detects the edge orientations based on the color difference components CDv in the vertical direction and the color difference components CDh in the horizontal direction as described later. This ensures the accurate and relatively high-speed detection of the edge orientations. The details of the edge orientation map creation process will be described later.

After creation of the edge orientation map, the CPU determines the tone value of the G component in each target pixel other than the G pixel (that is, either the R pixel or the B pixel) by interpolation (G component interpolation process) (step S106). The G component interpolation process refers to the edge orientation map and performs interpolation with the values of the G component in adjacent pixels to determine the adequate value of the G component in the non-G target pixel. The details of this G component interpolation process will be described later.

The CPU subsequently performs interpolation of the remaining color component in the non-G target pixel other than the G pixel (non-G pixel interpolation process) (step S108). The G component of the non-G target pixel, which may be the R pixel or the B pixel, has already been determined by interpolation at preceding step S106. The processing of step S108 thus interpolates the B component for the R target pixel, while interpolating the R component for the B target pixel. The pixels other than the G pixels accordingly have obtained all the color components R, G, and B. The details of the non-G pixel interpolation process (interpolation of the remaining color component after interpolation of the G component with regard to each non-G target pixel other than the G pixel) will be described later.

On completion of the interpolation in the pixels other than the G pixels, the CPU interpolates the missing color components (the R component and the B component) of the raw image data with regard to each G target pixel (G pixel interpolation process) (step S110). The G pixel interpolation process also refers to the edge orientation map and performs interpolation to determine the adequate values of the missing color components in the G target pixel. The details of this G pixel interpolation process will be described later.

On completion of the interpolation of the missing color components in the pixels other than the G pixels (steps S106 and S108) and the interpolation of the missing color components in the G pixels (step S110), all the pixels have obtained all the color components R, G, and B. The CPU subsequently outputs the obtained RGB color components as color image data generated from the raw image data (step S112) and terminates the color image data generation process of FIG. 3.

As described above, the color image data generation process of this embodiment detects the edge orientations based on the color difference components CDv in the vertical direction and the color difference components CDh in the horizontal direction to create the edge orientation map. More specifically the edge orientations are detected according to the two different types (the color difference component between the G component and the R component and the color difference component between the G component and the B component) of the color difference components CDv in the vertical direction and the color difference components CDh in the horizontal direction. This characteristic enables creation of the edge orientation map with high accuracy. Application of this highly accurate edge orientation map enables adequate interpolation of the missing color components for the raw image data. Both the edge orientation map creation process and the interpolation of the missing color components are rather simple and are executable at the high speed. The above series of processing in the embodiment thus enables high-speed generation of adequate color image data from raw image data with a mosaic arrangement of the R, G, and B color components. The following description sequentially regards the details of the edge orientation map creation process, the G component interpolation process (interpolation of the G component in the pixels other than the G pixels), the non-G pixel interpolation process (interpolation of the remaining color component in the pixels other than the G pixels), and the G pixel interpolation process (interpolation of the missing color components in the G pixels).

C. Edge Orientation May Creation Process

Figure 7:
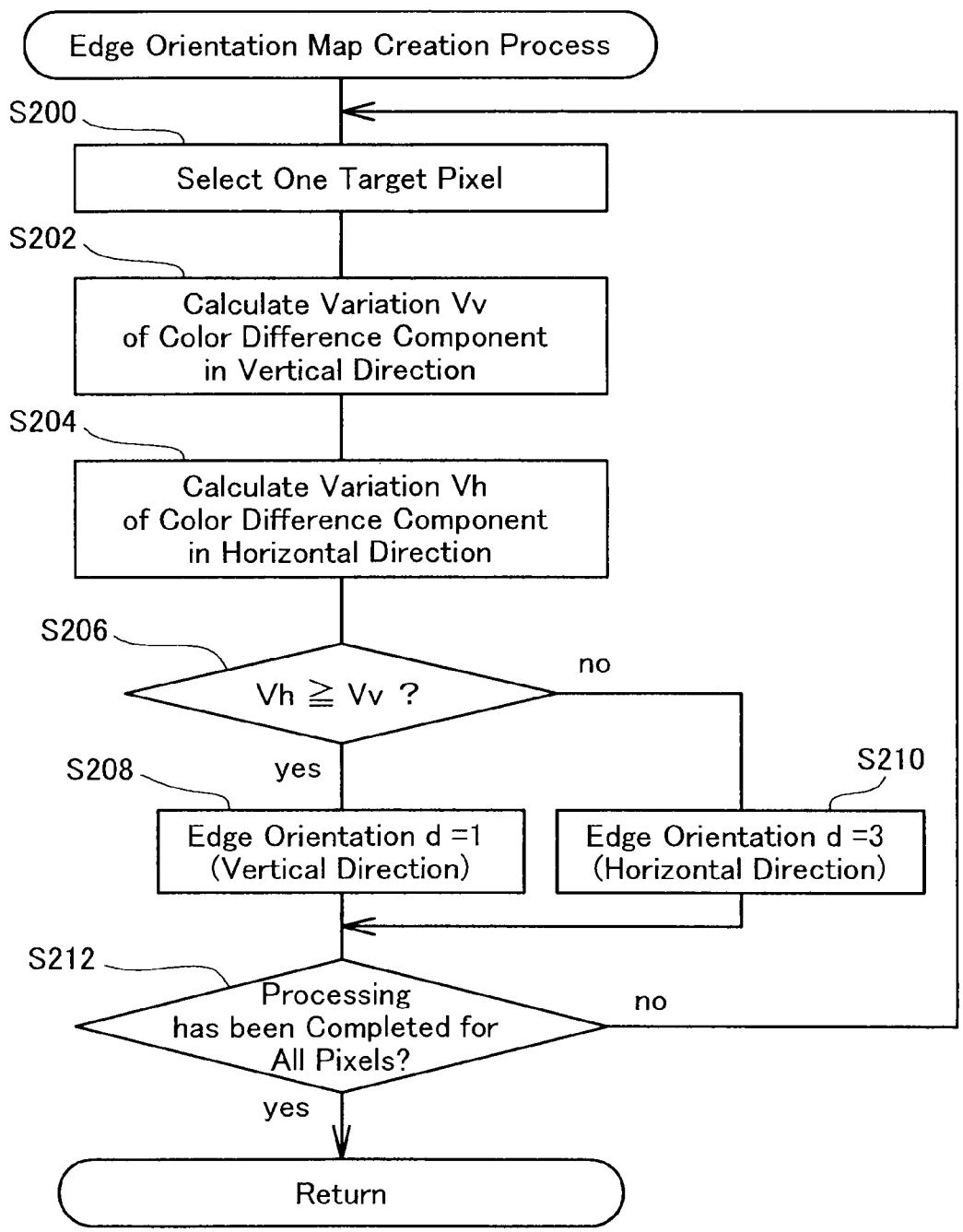
FIG. 7 is a flowchart showing the details of an edge orientation map creation process executed in the color image data generation process of FIG. 3 by the image processing apparatus of the embodiment.

FIG. 7 is a flowchart showing the details of the edge orientation map creation process executed at step S104 in the color image data generation process of FIG. 3 by the image processing apparatus 30 of the embodiment.

The edge orientation map creation process first selects one target pixel as an object of detection of the edge orientation (step S200) and calculates a variation Vv of the color difference component in the vertical direction (step S202). The variation Vv in the vertical direction is calculated naturally from the color difference components CDv in the vertical direction.

FIG. 8 shows calculation of the variation Vv in the vertical direction from the color difference components CDv in the vertical direction. FIG. 8(a) shows a calculation formula, and FIG. 8(b) conceptually shows calculation of the variation Vv in the vertical direction according to the calculation formula of FIG. 8(a). A hatched rectangle in FIG. 8(b) represents the position of a target pixel. The computation process of the variation Vv in the vertical direction first calculates the square of a difference between the color difference components CDv in the target pixel and an upper pixel above the target pixel. Similarly the computation process calculates the square of a difference between the color difference components CDv in the target pixel and a lower pixel below the target pixel. Open arrows shown between the hatched target pixel and the upper pixel and between the hatched target pixel and the lower pixel in FIG. 8(b) represent computation of the squares of the differences between the color difference components CDv of the respective pixels.

After computation of the squares of the respective differences between the color difference components CDv in the target pixel and the upper and the lower pixels, the computation process similarly calculates the squares of respective differences between the color difference components CDv in a left pixel on the left of the target pixel and upper and lower pixels above and below the left pixel, as well as the squares of respective differences between the color difference components CDv in a right pixel on the right of the target pixel and upper and lower pixels above and below the right pixel. FIG. 8(b) shows the six squares obtained from the six pairs of pixels arrayed in the vertical direction. The summation of these six squares is specified as the variation Vv in the vertical direction with regard to the target pixel.

Referring back to the flowchart of FIG. 7, after calculation of the variation Vv in the vertical direction, the edge orientation map creation process calculates a variation Vh of the color difference component in the horizontal direction (step S204). The variation Vh in the horizontal direction is calculated in the similar manner to the calculation of the variation Vv in the vertical direction except the use of the color difference components CDh in the horizontal direction for the computation.

FIG. 9 shows calculation of the variation Vh in the horizontal direction from the color difference components CDh in the horizontal direction. FIG. 9(a) shows a calculation formula, and FIG. 9(b) conceptually shows calculation of the variation Vh in the horizontal direction according to the calculation formula of FIG. 9(a). As shown by open arrows in FIG. 9(b), the computation process successively calculates the squares of respective differences between the color difference components CDh in a target pixel and left and right pixels on the left and on the right of the target pixel, the squares of respective differences between the color difference components CDh in an upper pixel above the target pixel and left and right pixels on the left and on the right of the upper pixel, and the squares of respective differences between the color difference components CDh in a lower pixel below the target pixel and left and right pixels on the left and on the right of the lower pixel. The summation of these six squares is specified as the variation Vh in the horizontal direction with regard to the target pixel.

Referring back again to the flowchart of FIG. 7, the variation Vv in the vertical direction and the variation Vh in the horizontal direction calculated as described above are compared each other with regard to the target pixel (step S206). When the variation Vh in the horizontal direction is greater or equal than the variation Vv in the vertical direction (step S206: yes), it is determined that an edge goes through the target pixel in the vertical direction. A value 'd' representing the edge orientation is then set equal to '1' (step S208). When the variation Vv in the vertical direction is greater than the variation Vh in the horizontal direction (step S206: no), on the contrary, it is determined that an edge goes through the target pixel in the horizontal direction. The value 'd' representing the edge orientation is then set equal to '3' (step S210). Namely the pixel with the edge orientation 'd' set to '1' has the edge in the vertical direction, whereas the pixel with the edge orientation 'd' set to '3' has the edge in the horizontal direction.

The squares of the differences between the color difference components are calculated in determination of the variation Vv in the vertical direction (see FIG. 8) and in determination of the variation Vh in the horizontal direction (see FIG. 9). Such calculation enables detection of the edge orientations without taking into account the signs of the differences between the color difference components. One possible modification may thus calculate the absolute values of respective differences between the color difference components, instead of calculation of their squares. The summation of the absolute values with regard to the adjacent pixels gives the variation Vv in the vertical direction or the variation Vh in the horizontal direction. The square, however, enhances the difference between the color difference components, compared with the absolute value and thus increases the detection accuracy of the edge orientation. It should be understood that this invention is not limited to the absolute or square differences and that any other difference or similarity measure can be used instead to determine edge orientations.

Some attention is required for the comparison between the variation Vv in the vertical direction and the variation Vh in the horizontal direction. There are accordingly some variations in edge orientation map creation process shown in FIG. 7 as described below.

FIG. 10 shows possible arrangements of adjacent pixels around a target pixel selected for detection of the edge orientation. The adjacent pixels around the selected target pixel satisfy one of the four states shown in FIGS. 10(a) through 10(d). In the state of FIG. 10(a), a target pixel column of a target pixel and its upper and lower pixels in the vertical direction gives the squares of respective two color difference components $CD_{GR}$ between the G component and the R component, whereas left and right pixel columns in the vertical direction on the left and on the right of the target pixel column give the squares of respective four color difference components $CD_{GB}$ between the G component and the B component. The variation Vv in the vertical direction is accordingly computed as the sum of the two squares of the color difference components $CD_{GR}$ and the four squares of the color difference components $CD_{GB}$. The variation Vh in the horizontal direction is similarly computed as the sum of the two squares of the color difference components $CD_{GR}$ and the four squares of the color difference components $CD_{GB}$. The simple comparison between the variation Vv in the vertical direction and the variation Vh in the horizontal direction thus enables adequate detection of the edge orientation in the target pixel.

In the state of FIG. 10(b), each of the variation Vv in the vertical direction and the variation Vh in the horizontal direction is computed as the sum of the two squares of the color difference components $CD_{GB}$ and the four squares of the color difference components $CD_{GR}$. The simple comparison between the variation Vv in the vertical direction and the variation Vh in the horizontal direction thus enables adequate detection of the edge orientation in the target pixel.

This is, however, not satisfied in the state of FIG. 10(c) or in the state of FIG. 10(d). For example, in the state of FIG. 10(c), the variation Vv in the vertical direction is computed as the sum of the two squares of the color difference components $CD_{GB}$ and the four squares of the color difference components $CD_{GR}$. The variation Vh in the horizontal direction is, however, computed as the sum of the two squares of the color difference components $CD_{GR}$ and the four squares of the color difference components $CD_{GB}$. Namely the variation Vv in the vertical direction is not simply comparable with the variation Vh in the horizontal direction. In the state of FIG. 10(d), the variation Vv in the vertical direction is also not simply comparable with the variation Vh in the horizontal direction.

One possible measure against this problem detects the edge orientations only for the pixels satisfying the state of FIG. 10(a) or the state of FIG. 10(b). In this measure, the edge orientation map creation process of FIG. 7 selects a target pixel among only the pixels other than the G pixels, that is, the R pixels and the B pixels, at step S200. As described previously with reference to FIG. 2, the G pixels occupy half the area of the Bayer color filter array. Detection of the edge orientations for only the R pixels and the B pixels halves the number of pixels to be processed and ensures the high-speed creation of the edge orientation map. In this case, the edge orientations are unknown in the G pixels. Application of the adequate interpolation procedure can, however, prevent the adverse effects of the unknown edge orientations in the G pixels on the resulting picture quality.

The edge orientation is not undetectable for the G pixels but is detectable according to the following procedure. The procedure of FIG. 11 applies a double weight to a target pixel column or a target pixel row including a target pixel, compared with weights applied to other pixel columns or pixel rows. FIG. 11(a) shows a calculation formula used for determination of the variation Vv in the vertical direction, and FIG. 11(b) shows a calculation formula used for determination of the variation Vh in the horizontal direction. According to the calculation formulae, the variation Vv in the vertical direction and the variation Vh in the horizontal direction are computable with regard to all the pixels, that is, the G pixels, the R pixels, and the B pixels. The edge orientations are then determinable for all these pixels by the comparison between the variation Vv in the vertical direction and the variation Vh in the horizontal direction. In the calculation formulae of FIG. 11, the weight may alternatively be halved for the pixel columns or pixel rows without the target pixel.

Another computation method may detect the edge orientation in each target pixel based on variations of two pixel columns and variations of two pixel rows, that is, a target pixel column including a target pixel and one adjacent pixel column adjoining to the target pixel column and a target pixel row including the target pixel and one adjacent pixel row adjoining to the target pixel row. FIG. 12(a) shows a calculation formula used for calculating the variation Vv in the vertical direction with regard to a target pixel column including a target pixel in the vertical direction and a right pixel column in the vertical direction on the right of the target pixel column. FIG. 12(b) conceptually shows calculation of the variation Vv in the vertical direction according to the calculation formula of FIG. 12(a). As described previously with reference to FIG. 4, the pixel columns of the alternately arranged G pixels and R pixels and the pixel columns of the alternately arranged G pixels and B pixels appear alternately in the vertical direction of the raw image data based on the Bayer color filter array. The variation Vv in the vertical direction according to the calculation formula of FIG. 12(a) is accordingly given as the sum of the two squares of the color difference components $CD_{GB}$ and the two squares of the color difference components $CD_{GR}$.

The variation Vh in the horizontal direction is similarly calculated with regard to two pixel rows. FIG. 12(c) shows a calculation formula used for calculating the variation Vh in the horizontal direction, and FIG. 12(d) conceptually shows calculation of the variation Vh in the horizontal direction according to the calculation formula of FIG. 12(c). As described previously with reference to FIG. 4, the pixel rows of the alternately arranged G pixels and R pixels and the pixel rows of the alternately arranged G pixels and B pixels appear alternately in the horizontal direction of the raw image data based on the Bayer color filter array. Like the variation Vv in the vertical direction according to the calculation formula of FIG. 12(a), the variation Vh in the horizontal direction according to the calculation formula of FIG. 12(c) is accordingly given as the sum of the two squares of the color difference components $CD_{GB}$ and the two squares of the color difference components $CD_{GR}$. The edge orientation is thus detectable by comparison between the variation Vv in the vertical direction and the variation Vh in the horizontal direction.

Referring back again to the flowchart of FIG. 7, as described above, the edge orientation map creation process of the embodiment calculates the variation Vv of the color difference component in the vertical direction and the variation Vh of the color difference component in the horizontal direction (steps S202 and S204) and detects the edge orientation of the target pixel based on the comparison between the variation Vv in the vertical direction and the variation Vh in the horizontal direction (steps S206 to S210). In the case of computation of the variations Vv and Vh according to the method shown in FIGS. 8 and 9, the target pixel as the object of detection of the edge orientation is selectable among only the pixels other than the G pixels, that is, the R pixels and the B pixels (step S200). In the case of computation of the variations Vv and Vh according to one of the methods shown in FIGS. 11 and 12, on the other hand, the target pixel is selectable among all the pixels (step S200). This is, however, not restrictive. Even in the case of computation of the variations Vv and Vh according to one of the methods shown in FIGS. 11 and 12, the target pixel may be selected among only the pixels other than the G pixels, that is, the R pixels and the B pixels. After detection of the edge orientation in the target pixel selected at step S200, the CPU determines whether the edge orientations have been detected with regard to all the pixels (step S212). When there is any unprocessed pixel (step S212: no), the edge orientation map creation process returns to step S200 to select another target pixel among unprocessed pixels and executes the subsequent series of processing. On completion of detection of the edge orientations with regard to all the pixels (step S212: yes), the edge orientation map creation process of FIG. 7 is terminated.

The edge orientation map creation process of the embodiment enables detection of the edge orientations included in the raw image data with extremely high accuracy. Interpolation of the missing color components in the respective pixels constituting the raw image data is performed with reference to this highly accurate edge orientation map. This ensures adequate interpolation without the occurrence of pseudo colors. The following describes the reason for creation of the highly accurate edge orientation map according to the edge orientation map creation process of the embodiment.

As shown in FIGS. 2 and 4, the raw image data based on the Bayer color filter array have data of any color component R, G, or B at only discrete pixel positions. The G component has data at the rate of 1 per 2 pixels (G pixels), while the R component and the B component have data at the rate of 1 per 4 pixels (R pixels and B pixels). Because of such discrete appearance of data, it is difficult to detect the edge with high accuracy from a variation in tone value with regard to each of the color components R, G, and B.

The color difference components are accordingly used instead of the R, G, and B color components. With regard to each pixel column or pixel row having an alternate arrangement of the G component and the R component, the raw image data is converted into data of color difference components between the G component and the R component. With regard to each pixel column or pixel row having an alternate arrangement of the G component and the B component, the raw image data is converted into data of color difference components between the G component and the B component. The bottom of FIG. 4 shows conversion of the raw image data into the color difference components CDv in the vertical direction and the color difference components CDh in the horizontal direction. The pixel columns and the pixel rows having the color difference components between the G component and the B component are shown as hatched rectangles in FIG. 4.

Variations of color difference components are comparable between adjacent pixel columns or adjacent pixel rows. For example, in an image area having an abrupt change in lightness, there are significant variations of both the color difference component between the G component and the R component and the color difference component between the G component and the B component. Similarly in an image area having an abrupt change in color, there are also significant variations of either or both the color difference component between the G component and the R component and/or the color difference component between the G component and the B component. The variations of the color difference components even having different types are accordingly comparable. An edge is then detectable according to the color difference components of adjacent pixel columns or adjacent pixel rows. This edge detection technique according to the color difference components of adjacent pixel columns or adjacent pixel rows enables accurate detection of even small-scale edges.

The edge orientation map creation process of the embodiment detects the edge orientations with high accuracy based on the above consideration and accordingly gives a highly accurate edge orientation map. The concrete procedure converts the raw image data based on the Bayer color filter array into the color difference components CDv in the vertical direction and the color difference components CDh in the horizontal direction. As shown in the bottom of FIG. 4, the obtained data of the color difference components have an alternate arrangement of pixel columns or pixel rows of the color difference component $CD_{GR}$ between the G component and the R component and pixel columns or pixel rows of the color difference component $CD_{GB}$ between the G component and the B component. The variations of the color difference components are then calculated according to the calculation formulae of FIGS. 8 and 9 or according to one of the calculation formulae of FIGS. 11 and 12. The calculated variations are obtained from the color difference components of adjacent pixel columns or adjacent pixel rows having different types. The variations calculated even from the color difference components having different types are comparable for the edge detection as described above. Such edge detection according to the color difference components of the adjacent pixel columns or the adjacent pixel rows ensures highly accurate detection of even a small-scale edge. The accurate detection of the edge orientation in each pixel is thus enabled by the comparison between the variation Vv in the vertical direction and the variation Vh in the horizontal direction.

As clearly understood from this explanation, in the edge orientation map creation process of the embodiment, it is important to compute the variation Vv in the vertical direction and the variation Vh in the horizontal direction based on the color difference components of adjacent pixel columns or adjacent pixel rows. In other words, it is not so important what calculation formulae are used for the computation of the variation Vv in the vertical direction and the variation Vh in the horizontal direction. Diverse calculation formulae are thus applicable in place of the calculation formulae of FIGS. 8 and 9 or the calculation formulae of FIGS. 11 and 12.

Figure 13:
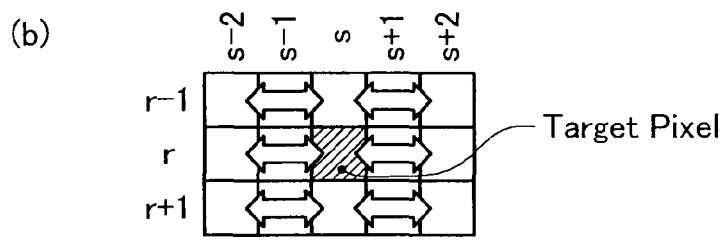
FIG. 13 shows another method applicable to calculate a variation of the color difference component.
Figure 14:
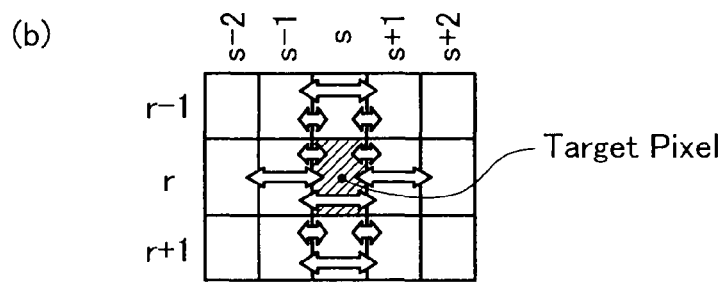
FIG. 14 shows still another method applicable to calculate a variation of the color difference component.

One modified procedure may calculate the squares of respective differences between the color difference components of every two pixels in each pixel column or each pixel row and sum up the squares to determine the variation of the color difference component as shown in FIG. 13. Although FIG. 13 shows only the calculation of the variation Vh in the horizontal direction, the variation Vv in the vertical direction is computable in the similar manner. Another modified procedure may calculate the squares of respective differences between the color difference components of adjacent pixels as well as every two pixels in each pixel column or each pixel row and sum up the squares to determine the variation of the color difference component as shown in FIG. 14.

Figure 15:
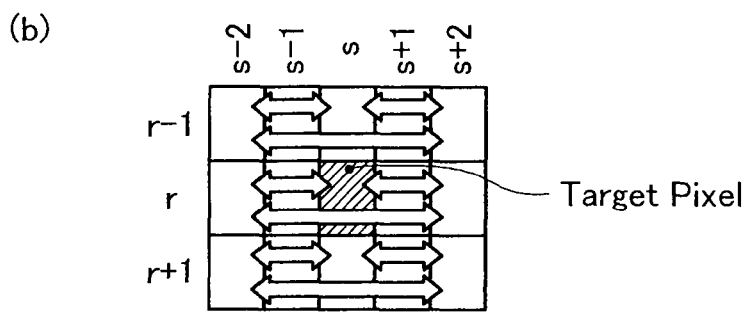
FIG. 15 shows another method applicable to calculate even a small variation of the color difference component.

Still another modification may determine the variation of the color difference component by taking into account differences between the color difference components of farther pixels. For example, a modified procedure of FIG. 15 determines the variation of the color difference component by taking into account differences between the color difference components of every four pixels in each pixel column or each pixel row, as well as the differences between the color difference components of every two pixels in each pixel column or each pixel row. Although FIGS. 14 and 15 show only the calculation of the variation Vh in the horizontal direction, the variation Vv in the vertical direction is computable in the similar manner.

D. G Component Interpolation Process

As described above with reference to the flowchart of FIG. 3, the color image data generation process of the embodiment starts the G component interpolation process to interpolate the G component in the pixels other than the G pixels (that is, the R pixels and the B pixels) (step S106), after creation of the edge orientation map (step S104).

Figure 16:
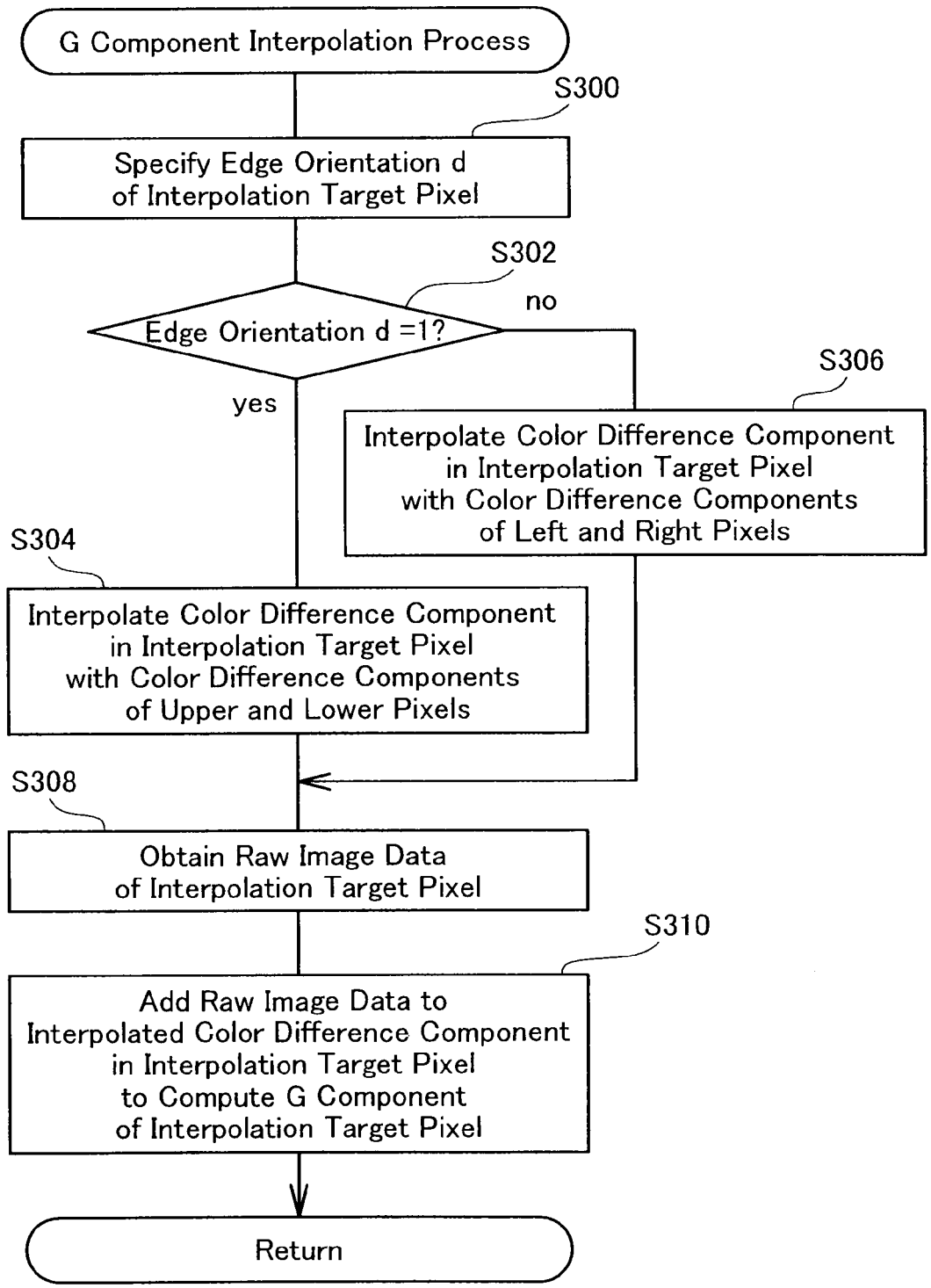
FIG. 16 is a flowchart showing the details of a G component interpolation process executed in the color image data generation process of FIG. 3 by the image processing apparatus of the embodiment.

FIG. 16 is a flowchart showing the details of the G component interpolation process to interpolate the G component in the R pixels and the B pixels. The G component interpolation process first refers to the created edge orientation map to specify the edge orientation 'd' in each interpolation target pixel as an object of interpolation (step S300). As described above, the edge orientation map may have the edge orientations 'd' detected for all the pixels or the edge orientations 'd' detected for only the non-G pixels (that is, the R pixels and the B pixels). In interpolation of the G component in the non-G pixels, the edge orientation 'd' is always specified by referring to the edge orientation map.

The G component interpolation process subsequently determines whether the specified edge orientation 'd' is equal to '1' (step S302). When the specified edge orientation 'd' is equal to '1' (step S302: yes), a color difference component of the interpolation target pixel is interpolated with the color difference components of upper and lower pixels above and below the interpolation target pixel (step S304). When the specified edge orientation 'd' is equal to '3' (step S302: no), on the other hand, the color difference component of the interpolation target pixel is interpolated with the color difference components of left and right pixels on the left and on the right of the interpolation target pixel (step S306). The G component interpolation process then obtains the raw image data of the interpolation target pixel (step S308) and adds the raw image data to the interpolated color difference component of the interpolation target pixel to compute the G component of the interpolation target pixel (step S310). This series of processing is described more in detail.

FIG. 17 shows a processing flow of computing the missing G component in non-G pixels. The interpolation target pixel is a non-G pixel, that is, either an R pixel or a B pixel. When the interpolation target pixel is the R pixel, the adjacent pixels are arranged as shown in FIG. 17(*a*). When the interpolation target pixel is the B pixel, on the other hand, the adjacent pixels are arranged as shown in FIG. 17(*b*). It is here assumed that the interpolation target pixel as the object of interpolation of the G component is the R pixel and that the specified edge orientation 'd' is equal to '1'.

At the edge orientation 'd' equal to '1', the variation Vh of the color difference component in the horizontal direction is greater than the variation Vv of the color difference component in the vertical direction. In general, interpolation in the state of a less variation (closer to the steady state) is expected to have the better interpolation result than interpolation in the state of a greater variation. The color difference component in the vertical direction having a less variation is thus used for the computation of the G component. As clearly understood from FIG. 17(*a*), in the R interpolation target pixel, both the color difference component in the vertical direction and the color difference component in the horizontal direction are obtained by subtraction of the R component from the G component. Namely the G component of the interpolation target pixel is computable from either the color difference component in the vertical direction or the color difference component in the horizontal direction. For the enhanced interpolation accuracy, the G component of the interpolation target pixel is computed from the color difference component in the vertical direction having a less variation, as already indicated by the value '1' of the corresponding edge-orientation indicator 'd' in the interpolation target pixel.

The color difference component in the vertical direction is subtraction of the R component from the G component, and the raw image data obtained in the interpolation target pixel is the R component. Addition of the raw image data to the color difference component thus immediately determines the G component in the interpolation target pixel. The color difference component used for computation of the G component may be the color difference component in the interpolation target pixel calculated according to the calculation formula of FIG. 5. Preferably the color difference component used for computation of the G component may be the color difference component after removal of noise with the low pass filter shown in FIG. 6.

The color difference component of the interpolation target pixel may be calculated from the color difference components of adjacent pixels, instead of being directly read. This modified procedure may read the color difference components of the upper and the lower pixels above and below the interpolation target pixel in the vertical direction and calculate the color difference component in the interpolation target pixel from the read-out color difference components. The G component interpolation process of FIG. 16 calculates the color difference component of the interpolation target pixel from the color difference components of the adjacent pixels at step S304 or at step S306. Another modified procedure may read the color difference components of the pixels in a larger neighborhood of the interpolation target pixel in order to calculate the color difference component in the interpolation target pixel from the read-out color difference components.

After computation of the G component in all the interpolation target pixels as described above, the CPU terminates the G component interpolation process of FIG. 16 and goes back to the color image data generation process of FIG. 3. The color image data generation process subsequently starts the non-G pixel interpolation process to interpolate the remaining color component in the pixels other than the G pixels (step S108).

E. Non-G Pixel Interpolation Process

Figure 18:
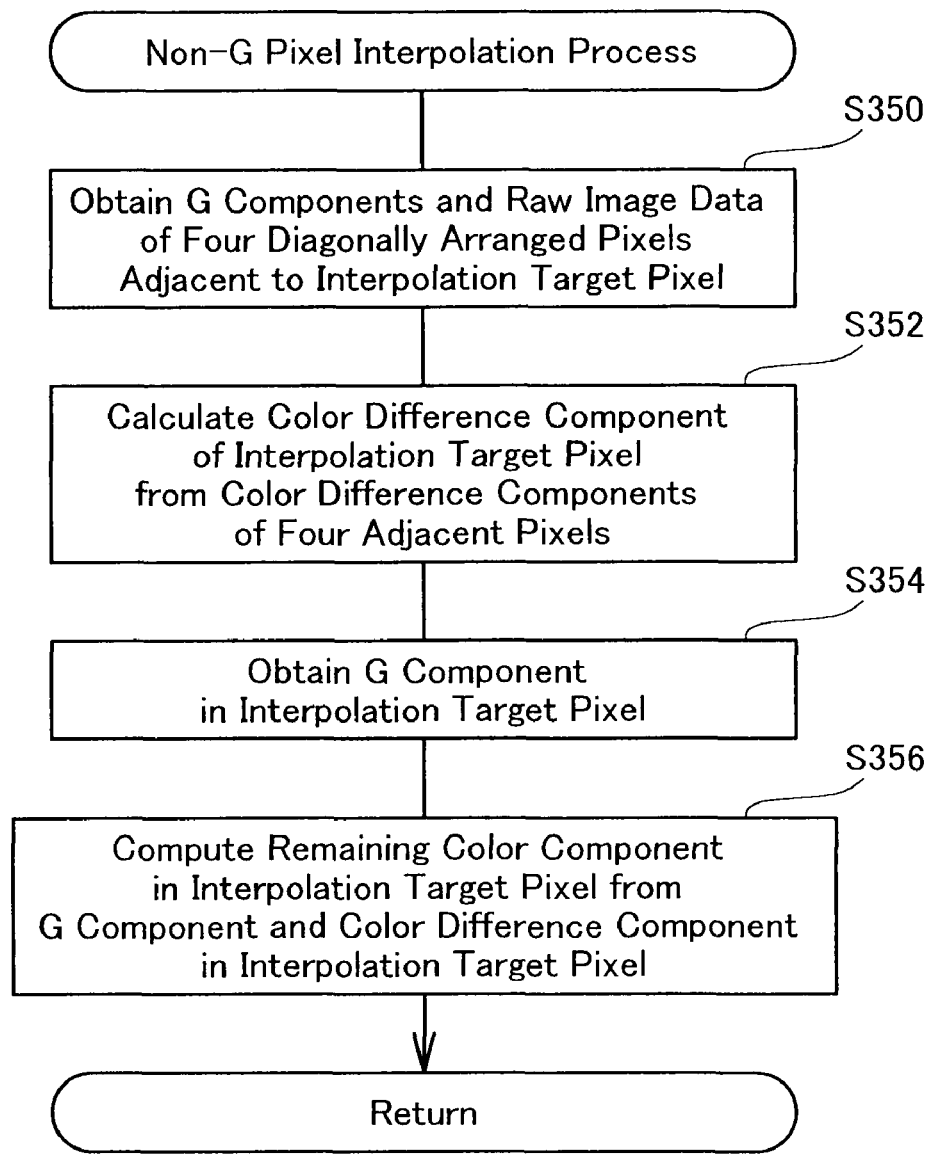
FIG. 18 is a flowchart showing the details of a non-G pixel interpolation process executed in the color image data generation process of FIG. 3 by the image processing apparatus of the embodiment.

FIG. 18 is a flowchart showing the details of the non-G pixel interpolation process. As explained previously, the non-G pixel interpolation process interpolates the remaining color component in each non-G pixel, that is, the B component in the R pixel or the R component in the B pixel, after interpolation of the G component in the non-G pixel. The basic concept of the non-G pixel interpolation process is briefly described, prior to the processing details.

The non-G pixel interpolation process interpolates the B component in the R pixel, while interpolating the R component in the B pixel. When the interpolation target pixel is the R pixel, four diagonally arranged pixels adjacent to the interpolation target pixel are all B pixels as shown in FIG. 17(a). The B component is obtained as the raw image data of these four adjacent pixels. When the interpolation target pixel is the B pixel, on the other hand, four diagonally arranged pixels adjacent to the interpolation target pixel are all R pixels as shown in FIG. 17(b). The R component is obtained as the raw image data of these four adjacent pixels. The simplest procedure performs interpolation with the raw image data of the four diagonally arranged pixels adjacent to the interpolation target pixel to determine the tone value of the remaining color component in the interpolation target pixel. For example, the R component in the interpolation target pixel can be obtained as average of four raw R components available in diagonally surrounding pixels. Similarly, the B component in the interpolation target pixel can be obtained as average of four raw B components available in diagonally surrounding pixels.

The direct interpolation of the remaining color component with the raw image data of the adjacent pixels may cause the occurrence of pseudo colors due to some deviation in difference from the other color component. In natural color images, the RGB data is significantly correlated both in the intra- and inter-channel senses. This means that the pixels in local image areas usually have similar color difference characteristics. It is accordingly preferable to interpolate the color difference component in the interpolation target pixel with the color difference components of the adjacent pixels and determine the tone value of the remaining color component in the interpolation target pixel based on the interpolated color difference component. Thus, instead of the direct interpolation with the raw image data of the four diagonally arranged pixels adjacent to the interpolation target pixel, another available procedure calculates the color difference component of the interpolation target pixel from the color difference components of the four adjacent pixels and determines the tone value of the remaining color component in the interpolation target pixel based on the calculated color difference component of the interpolation target pixel. For example, the interpolation object is the B component for the R interpolation target pixel in the state of FIG. 17(a). The preferable procedure obtains the color difference components between the G component and the B component in the four diagonally arranged B pixels adjacent to the R interpolation target pixel and uses these four color difference components to calculate the corresponding color difference component in the R interpolation target pixel. For example, the color difference component in the interpolation target location can be calculated as average of available color difference components. The procedure then calculates the tone value of the remaining color component from the calculated color difference component and the interpolated G component in the R interpolation target pixel.

The diagonally arranged pixels adjacent to the R interpolation target pixel are all B pixels. Both the color difference components CDv in the vertical direction and the color difference components CDh in the horizontal direction computed with regard to these adjacent pixels according to the calculation formulae of FIG. 5 are the color difference components between the G component and the B component. The corresponding color difference component of the interpolation target pixel may be calculated from the total eight color difference components. One typical procedure may calculate the average of the color difference component CDv in the vertical direction and the color difference component CDh in the horizontal direction in each of the four diagonally arranged pixels adjacent to the interpolation target pixel as a representative color difference component in the pixel and determine the corresponding color difference component of the interpolation target pixel from the representative color difference components of the four adjacent pixels. Another typical procedure may detect the edge orientation in the interpolation target pixel and calculate the color difference component of the interpolation target pixel from only the color difference components (obtained according to the calculation formulae of FIG. 5) of the adjacent pixels satisfying the detected edge orientation. This method of determining the color difference component of the interpolation target pixel by taking into account both the color difference components CDv in the vertical direction and the color difference components CDh in the horizontal direction with regard to the adjacent pixels requires the rather complicated series of processing. The calculation based on the G component and the B component in the four diagonally arranged pixels adjacent to the interpolation target pixel, on the other hand, enables the higher-speed determination of the color difference component $CD_{GB}$ in the interpolation target pixel.

Based on this basic concept, the non-G pixel interpolation process of the embodiment shown in the flowchart of FIG. 18 interpolates the remaining color component in each non-G pixel, after interpolation of its G component. The concrete procedure of the non-G pixel interpolation process is explained with reference to the flowchart of FIG. 18.

The non-G pixel interpolation process first obtains the G components and the raw image data of the four diagonally arranged pixels adjacent to the interpolation target pixel (step S350). When the interpolation target pixel is the R pixel, the four diagonally arranged adjacent pixels are all B pixels as shown in FIG. 17(a). The raw image data of these adjacent pixels obtained here accordingly regards the B component. When the interpolation target pixel is the B pixel, on the other hand, the four diagonally arranged adjacent pixels are all R pixels as shown in FIG. 17(b). The raw image data of these adjacent pixels obtained here accordingly regards the R component.

The non-G pixel interpolation process subsequently calculates the color difference components of these four adjacent pixels by subtraction of the G component from the raw image data and computes the average of the four color difference components as the color difference component of the interpolation target pixel (step S352). In the application hereof, the color difference component generally represents subtraction of the R component or the B component from the G component as shown in FIG. 5. The calculation of step S352, however, changes the sign of the color difference component by subtraction of the G component from the raw image data (the R component or the B component). This saves changing the sign in the later computation.

After computation of the color difference component in the interpolation target pixel, the non-G pixel interpolation process obtains the G component of the interpolation target pixel (step S354). The interpolation target pixel is the non-G pixel, so that the raw image data of the interpolation target pixel does not regard the G component. The G component of the interpolation target pixel has, however, been already determined by the G component interpolation process of FIG. 16 executed prior to this non-G pixel interpolation process.

Summation of the color difference component of the interpolation target pixel computed at step S352 and the G component obtained at step S354 determines the remaining color component in the interpolation target pixel (step S356).

After computation of the remaining color component in all the non-G interpolation target pixels as described above, the CPU terminates the non-G pixel interpolation process of FIG. 18 and goes back to the color image data generation process of FIG. 3. The color image data generation process subsequently starts the G pixel interpolation process to interpolate the missing color components in the G pixels (step S110).

F. G Pixel Interpolation Process

Figure 19:
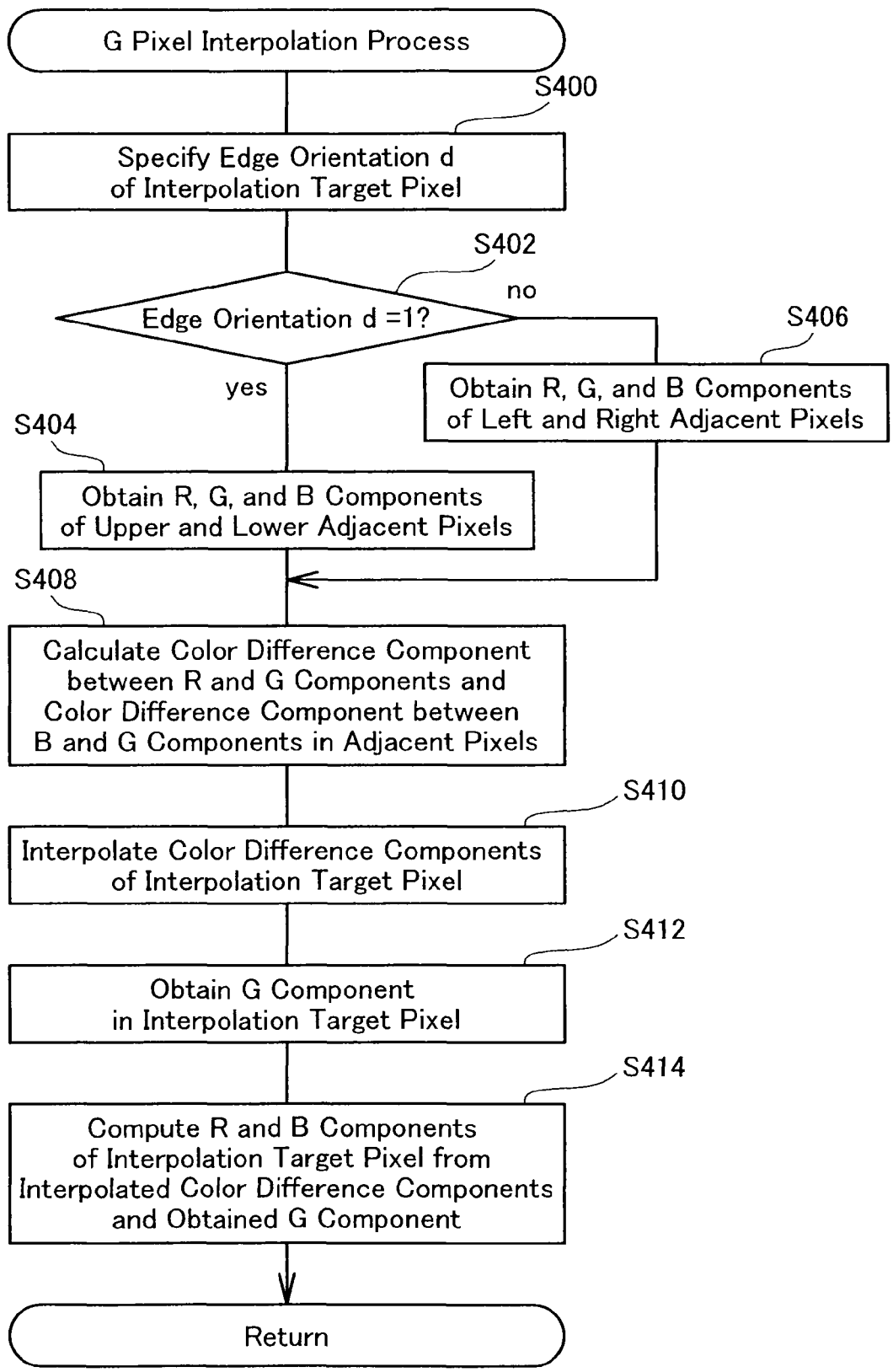
FIG. 19 is a flowchart showing the details of a G pixel interpolation process executed in the color image data generation process of FIG. 3 by the image processing apparatus of the embodiment.

FIG. 19 is a flowchart showing the details of the G pixel interpolation process. The G pixel interpolation process first specifies the edge orientation 'd' in each interpolation target pixel as an object of interpolation (step S400). The edge orientations have been detected in advance and set in the edge creation map by the edge orientation map creation process of FIG. 7. As explained previously, the edge orientations may be detected for all the pixels or alternatively for only the non-G pixels. When the edge orientations have been detected for all the pixels, the processing of step S400 immediately specifies the edge orientation of the interpolation target pixel by referring to the edge orientation map. When the edge orientations have been detected for only the non-G pixels, on the other hand, the processing of step S400 estimates the edge orientation of the interpolation target pixel from detected edge orientations of adjacent pixels.

Figure 20:
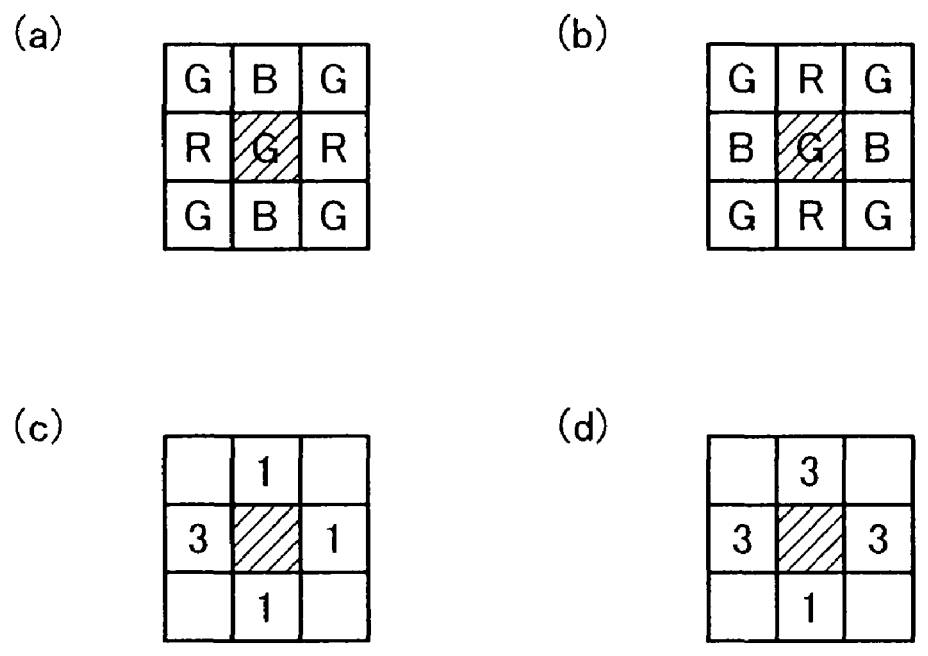

FIG. 20 shows estimation of the edge orientation in the interpolation target pixel from the edge orientations of the adjacent pixels. The G pixel interpolation process interpolates the missing (that is, R and B) color components in the G pixels. The original pixels of raw data surrounding the interpolation target pixel satisfy either of an arrangement of FIG. 20(a) or an arrangement of FIG. 20(b). In FIGS. 20(a) and 20(b), a hatched rectangle represents the interpolation target pixel. This estimation is performed on the assumption that the edge orientations have been detected for only the non-G pixels. The edge orientations have accordingly been set in four adjacent pixels above, below, on the left, and on the right of the interpolation target pixel.

FIGS. 20(c) and 20(d) show arrangements of the edge orientations 'd' in the four adjacent pixels of the interpolation target pixel. In the arrangement of the edge orientations 'd' of the four adjacent pixels shown in FIG. 20(c), the number of the adjacent pixels having the edge orientation 'd' set to '1' is greater than the number of the adjacent pixels having the edge orientation 'd' set to '3'. It is accordingly adequate to estimate the edge orientation 'd' of the interpolation target pixel as '1'. In the arrangement of the edge orientations 'd' of the four adjacent pixels shown in FIG. 20(d), on the other hand, the number of the adjacent pixels having the edge orientation 'd' set to '3' is greater than the number of the adjacent pixels having the edge orientation 'd' set to '1'. It is accordingly adequate to estimate the edge orientation 'd' of the interpolation target pixel as '3'.

In this manner, the estimation procedure counts the number of the adjacent pixels having the edge orientation 'd' set to '1' and the number of the adjacent pixels having the edge orientation 'd' set to '3' and specifies the edge orientation 'd' of the greater count as the edge orientation 'd' of the interpolation target pixel. Instead of counting the respective numbers of the adjacent pixels, another estimation procedure may calculate the sum of the edge orientations 'd' set in the four adjacent pixels above, below, on the left, and on the right of the interpolation target pixel. When there are the same numbers of the adjacent pixels having the edge orientation 'd' set to '1' and the adjacent pixels having the edge orientation 'd' set to '3', the sum of the edge orientations 'd' is equal to '8'. When the sum of the edge orientations 'd' is less than '8', it is expected that the greater number of the adjacent pixels have the edge orientation 'd' set to '1'. The edge orientation 'd' of the interpolation target pixel is thus specified as '1'. When the sum of the edge orientations 'd' is greater than '8', on the other hand, it is expected that the greater number of the adjacent pixels have the edge orientation 'd' set to '3'. The edge orientation 'd' of the interpolation target pixel is thus specified as '3'. When the sum of the edge orientations 'd' is equal to '8' (when there are the same numbers of the adjacent pixels having the edge orientation 'd' set to '1' and the adjacent pixels having the edge orientation 'd' set to '3'), the edge orientation 'd' of the interpolation target pixel may be specified as either '1' or '3'.

As described above, when the edge orientations 'd' have been set for all the pixels, the G pixel interpolation process of FIG. 19 simply reads the edge orientation 'd' of the interpolation target pixel from the edge orientation map at step S400. When the edge orientations 'd' have been set for only the non-G pixels, on the other hand, the G pixel interpolation process reads the edge orientations of adjacent pixels adjoining to the interpolation target pixel from the edge orientation map and estimates the edge orientation 'd' of the interpolation target pixel at step S400.

After specification of the edge orientation 'd' in the interpolation target pixel, the G pixel interpolation process determines whether the specified edge orientation 'd' is equal to '1' (step S402). When the specified edge orientation 'd' is equal to '1' (step S402: yes), it is determined that the edge goes through the interpolation target pixel in the vertical direction. The G pixel interpolation process accordingly obtains the R component, the G component, and the B component of the upper and the lower adjacent pixels above and below the interpolation target pixel (step S404). As shown in the arrangements of FIGS. 20(a) and 20(b), the upper and the lower adjacent pixels above and below the interpolation target pixel are always the non-G pixels. The missing color components of the non-G pixels have already been computed by the G component interpolation process of FIG. 16 and the non-G pixel interpolation process of FIG. 18. The R, G, and B components of these upper and the lower adjacent pixels are thus immediately obtainable.

When the specified edge orientation 'd' is not equal to '1' (step S402: no), on the other hand, it is determined that the edge goes through the interpolation target pixel in the horizontal direction. The G pixel interpolation process accordingly obtains the R component, the G component, and the B component of the left and the right adjacent pixels on the left and on the right of the interpolation target pixel (step S406). Since the left and the right adjacent pixels on the left and on the right of the interpolation target pixel are always the non-G pixels, the R, G, and B components of these left and right adjacent pixels are immediately obtainable.

The G pixel interpolation process then calculates the color difference components in the adjacent pixels as the objects of acquisition of the R, G, and B components (step S408). When the edge orientation 'd' of the interpolation target pixel is equal to '1' (step S402: yes), the G pixel interpolation process calculates the color difference components in the upper and the lower adjacent pixels. When the edge orientation 'd' of the interpolation target pixel is not equal to '1' (step S402: no), on the other hand, the G pixel interpolation process calculates the color difference components in the left and the right adjacent pixels. As in the non-G pixel interpolation process of FIG. 18, the sign-changed color difference components are obtained at step S408 by subtraction of the G component from the R component and by subtraction of the G component from the B component. This saves changing the sign in the later computation of the R component and the B component in the interpolation target pixel.

After calculation of the color difference components in the upper and the lower adjacent pixels or in the left and the right adjacent pixels (step S408), the G pixel interpolation process performs interpolation with the calculated color difference components of the adjacent pixels to compute the color difference components of the interpolation target pixel (step S410). As mentioned above, the color difference components calculated in the upper and the lower adjacent pixels or in the left and the right adjacent pixels are the sign-changed color difference components (that is, the color difference components by subtraction of the G component from the R component and the color difference components by subtraction of the G component from the B component). The interpolated color difference components are thus the sign-changed color difference components.

The G pixel interpolation process then obtains the G component of the interpolation target pixel (step S412). Since the interpolation target pixel is the G pixel, the raw image data directly regards the G component. The G pixel interpolation process subsequently computes the R component and the B component in the interpolation target pixel from the interpolated color difference components and the obtained G component of the interpolation target pixel (step S414). Since the interpolated color difference components are the sign-changed (that is, the green component subtracted from the red component, and the green component subtracted from the blue component) color difference components, simple addition of the G component to the interpolated color difference components determines the R component and the B component of the interpolation target pixel.

After computation of the missing color components (the R component and the B component) in all the G pixels as described above, the CPU terminates the G pixel interpolation process of FIG. 19 and goes back to the color image data generation process of FIG. 3.

On completion of the G pixel interpolation process (step S110), the demosaicking process, that is, interpolation of the missing color components has been concluded for all the pixels. The CPU then outputs the R, G, and B components of the respective pixels as the color image data generated from the raw image data (step S112) and terminates the color image data generation process of FIG. 3.

The digital camera 100 of the embodiment performs demosaicking of the raw image data to generate the color image data according to the series of processing described below in detail. The color image data generation process creates the edge orientation map, prior to the demosaicking process. By taking into account the variations of the color difference components CDv in the vertical direction and the color difference components CDh in the horizontal direction, the edge orientations of the respective pixels are detectable from the color difference components of the two different types (that is, the color difference components between the G component and the R component and the color difference components between the G component and the B component). This ensures highly accurate detection of even small-scale edges and accordingly enables creation of the accurate edge orientation map. The subsequent demosaicking process refers to this accurate edge orientation map to adequately interpolate the missing color components in the respective pixels.

Both the edge orientation map creation process and the interpolation of the missing color components are rather simple and are executable at the high speed. The series of processing in the embodiment thus enables high-speed generation of adequate color image data from raw image data with a mosaic arrangement of the R, G, and B color components.

It will be appreciated that the present invention can be implemented in an embodiment as a program of instructions stored on a computer-readable medium that, when executed by the computer, performs the method of the present invention. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

The digital camera 100 of the embodiment generates the color image data from the raw image data according to the procedure described above. The present invention is not restricted to any of this embodiment and its modifications described above but may be attained in various applications and aspects without departing from the scope or spirit of the main characteristics of the present invention.

What is claimed is:

1. An image processing apparatus that receives mosaic image data having settings of only one color component, among three color components R, G, and B corresponding to three primary colors of light, in each pixel and makes the received mosaic image data subject to a series of image processing to generate color image data with settings of all the three color components R, G, and B in each pixel, where the mosaic image data is expressed by a combination of pixel columns with alternate arrangement of pixels of the G component and pixels of the R component as another color component in a vertical direction, pixel columns with alternate arrangement of pixels of the G component and pixels of the B component as another color component in the vertical direction, pixel rows with alternate arrangement of pixels of the G component and pixels of the R component as another color component in a horizontal direction, and pixel rows with alternate arrangement of pixels of the G component and pixels of the B component as another color component in the horizontal direction, the image processing apparatus comprising:

a processing unit and a memory;

a vertical-direction color difference component computation module configured to obtain the G component in the pixel location of another color component or to obtain another color component in the G component pixel location using vertically neighboring available components in order to compute a vertical-direction color difference component between the G component and the another color component in each pixel included in each of the pixel columns of the mosaic image;

a horizontal-direction color difference component computation module configured to obtain the G component in the pixel location of another color component or to obtain another color component in the G component pixel location using horizontally neighboring color components in order to compute a horizontal-direction color difference component between the G component and the another color component in each pixel included in each of the pixel rows of the mosaic image;

an edge orientation detection module configured to select pixels of the R component and pixels of the B component from the mosaic image data and in each such pixel location to compare a variation of the vertical-direction color difference component with a variation of the horizontal-direction color difference component with regard to each of at least the selected pixels so as to detect edge orientations of the at least selected pixels; and a missing color component interpolation module configured to refer to the detected edge orientations and to interpolate a missing color component in each pixel of the mosaic image data with the settings of one color component in each pixel in the mosaic image data.

2. The image processing apparatus in accordance with claim 1, wherein the edge orientation detection module has:

a vertical-direction variation calculation module configured to calculate a variation of the vertical-direction color difference component in each target pixel as an object of detection of the edge orientation from vertical-direction color difference components of a target pixel column including the target pixel and vertical-direction color difference components of an adjacent pixel column adjoining to the target pixel column; and a horizontal-direction variation calculation module configured to calculate a variation of the horizontal-direction color difference component in each target pixel as an object of detection of the edge orientation from horizontal-direction color difference components of a target pixel row including the target pixel and horizontal-direction color difference components of an adjacent pixel row adjoining to the target pixel row.

3. The image processing apparatus in accordance with claim 1, wherein the edge orientation detection module detects the edge orientations in only the pixels of the R component and the pixels of the B component included in the mosaic image data.

4. The image processing apparatus in accordance with claim 1, wherein the edge orientation detection module detects the edge orientation in each pixel as the horizontal direction when the variation of the vertical-direction color difference component of the pixel is greater than the variation of the horizontal-direction color difference component of the pixel, the edge orientation detection module detects the edge orientation in each pixel as the vertical direction when the variation of the vertical-direction color difference component of the pixel is smaller than the variation of the horizontal-direction color difference component of the pixel, and the edge orientation detection module detects the edge orientation in each pixel as either the vertical direction or the horizontal direction when the variation of the vertical-direction color difference component of the pixel is equal to the variation of the horizontal-direction color difference component of the pixel.

5. The image processing apparatus in accordance with claim 1, wherein the missing color component interpolation module interpolates the G component as the missing color component in an interpolation target pixel as an object of interpolation with color components in one pair of adjacent pixels, which is selected between a pair of upper and lower adjacent pixels above and below the interpolation target pixel and a pair of left and right adjacent pixels on the left and on the right of the interpolation target pixel.

6. The image processing apparatus in accordance with claim 5, wherein the missing color component interpolation module has:

a color difference component interpolation module configured to interpolate either a vertical-direction color difference component or a horizontal-direction color difference component in the interpolation target pixel with either vertical-direction color difference components in the pair of upper and lower adjacent pixels above and below the interpolation target pixel or horizontal-direction color difference components in the pair of left and right adjacent pixels on the left and on the right of the interpolation target pixel; and a G component computation module configured to compute the G component in the interpolation target pixel, based on either the vertical-direction color difference component or the horizontal-direction color difference component interpolated in the interpolation target pixel and setting of a color component of the interpolation target pixel in the mosaic image data.

7. The image processing apparatus in accordance with claim 5, wherein the missing color component interpolation module interpolates the G component in all pixels with no settings of the G component in the mosaic data and subsequently interpolates the R component and the B component in the pixels with the interpolated G components and settings of color components of the pixels in the mosaic image data.

8. The image processing apparatus in accordance with claim 1, wherein the edge orientation detection module detects the edge orientations in at least the pixels of the R component and the pixels of the B component included in the mosaic image data to create an edge orientation map, and the missing color component interpolation module refers to the edge orientations stored in the edge orientation map to interpolate the missing color component in each pixel of the mosaic image data.

9. An image processing method that receives mosaic image data having settings of only one color component, among three color components R, G, and B corresponding to three primary colors of light, in each pixel and makes the received mosaic image data subject to a series of image processing to generate color image data with settings of all the three color components R, G, and B in each pixel, the image processing method comprising using a processing unit to:

receive, as the mosaic image data, image data expressed by a combination of pixel columns with alternate arrangement of pixels of the G component and pixels of the R component as another color component in a vertical direction, pixel columns with alternate arrangement of pixels of the G component and pixels of the B component as another color component in the vertical direction, pixel rows with alternate arrangement of pixels of the G component and pixels of the R component as another color component in a horizontal direction, and pixel rows with alternate arrangement of pixels of the G component and pixels of the B component as another color component in the horizontal direction;

obtain the G component and the another color component in each pixel included in each of the pixel columns of the mosaic image data, and computing a vertical-direction color difference component between the G component and the another color component in each pixel included in each of the pixel columns in the vertical direction;

obtain the G component and the another color component in each pixel included in each of the pixel rows of the mosaic image data, and computing a horizontal-direction color difference component between the G component and the another color component in each pixel included in each of the pixel rows in the horizontal direction;

select pixels of the R component and pixels of the B component from the mosaic image data, and in each such pixel location comparing a variation of the vertical-direction color difference component with a variation of the horizontal-direction color difference component with regard to each of at least the selected pixels to detect edge orientations of the at least selected pixels; and refer to the detected edge orientations, and interpolating a missing color component in each pixel of the mosaic image data with the settings of one color component in each pixel in the mosaic image data.

10. A non-transitory computer-readable medium having a program that causes a computer to actualize a method of receiving mosaic image data having settings of only one color component, among three color components R, G, and B corresponding to three primary colors of light, in each pixel and making the received mosaic image data subject to a series of image processing to generate color image data with settings of all the three color components R, G, and B in each pixel, the program causing the computer to attain the functions of:

receiving, as the mosaic image data, image data expressed by a combination of pixel columns with alternate arrangement of pixels of the G component and pixels of the R component as another color component in a vertical direction, pixel columns with alternate arrangement of pixels of the G component and pixels of the B component as another color component in the vertical direction, pixel rows with alternate arrangement of pixels of the G component and pixels of the R component as another color component in a horizontal direction, and pixel rows with alternate arrangement of pixels of the G component and pixels of the B component as another color component in the horizontal direction;

obtaining the G component and the another color component in each pixel included in each of the pixel columns of the mosaic image data, and computing a vertical-direction color difference component between the G component and the another color component in each pixel included in each of the pixel columns in the vertical direction;

obtaining the G component and the another color component in each pixel included in each of the pixel rows of the mosaic image data, and computing a horizontal-direction color difference component between the G component and the another color component in each pixel included in each of the pixel rows in the horizontal direction;

selecting pixels of the R component and pixels of the B component from the mosaic image data, and in each such pixel location comparing a variation of the vertical-direction color difference component with a variation of the horizontal-direction color difference component with regard to each of at least the selected pixels to detect edge orientations of the at least selected pixels; and referring to the detected edge orientations, and interpolating a missing color component in each pixel of the mosaic image data with the settings of one color component in each pixel in the mosaic image data.

\* \* \* \* \*

UNITED STATES PATENT AND TRADEMARK OFFICE
CERTIFICATE OF CORRECTION

| | | |
|---|---|---|
| PATENT NO. | : 7,995,840 B2 | |
| APPLICATION NO. | : 12/058253 | |
| DATED | : August 9, 2011 | |
| INVENTOR(S) | : Rastislav Lukac | |

It is certified that error appears in the above-identified patent and that said Letters Patent is hereby corrected as shown below:

Title Page; item (56);

References Cited

FOREIGN PATENT DOCUMENTS:

Please change "JP 2002-018930  1/2002" to --JP 2002-016930  1/2002--.

Signed and Sealed this
Twenty-fifth Day of October, 2011

David J. Kappos
*Director of the United States Patent and Trademark Office*